US011865686B2

(12) United States Patent
Hubschmid et al.

(10) Patent No.: US 11,865,686 B2
(45) Date of Patent: Jan. 9, 2024

(54) STAPLING DEVICE

(71) Applicant: Signode Industrial Group LLC, Tampa, FL (US)

(72) Inventors: Benjamin Hubschmid, Buchs (CH); Dimitrios Takidis, Dübendorf (CH); Michael Wettstein, Lenzburg (CH)

(73) Assignee: Signode Industrial Group LLC, Tampa, FL (US)

( * ) Notice: Subject to any disclaimer, the term of this patent is extended or adjusted under 35 U.S.C. 154(b) by 0 days.

(21) Appl. No.: 17/728,951

(22) Filed: Apr. 25, 2022

(65) Prior Publication Data

US 2022/0250223 A1 Aug. 11, 2022

Related U.S. Application Data

(63) Continuation of application No. 16/588,368, filed on Sep. 30, 2019, now Pat. No. 11,311,995, which is a (Continued)

(30) Foreign Application Priority Data

May 3, 2017 (CH) .................................... 00591/17
May 3, 2017 (CH) .................................... 00592/17
(Continued)

(51) Int. Cl.
*B25C 5/02* (2006.01)
*B25C 5/15* (2006.01)
*B25C 5/16* (2006.01)

(52) U.S. Cl.
CPC .......... *B25C 5/0207* (2013.01); *B25C 5/0285* (2013.01); *B25C 5/15* (2013.01); *B25C 5/1624* (2013.01); *B25C 5/1637* (2013.01)

(58) Field of Classification Search
CPC ... B25C 5/0207; B25C 5/1624; B25C 5/1637; B25C 5/0285; B25C 5/15; B25C 5/0271; B25Q 5/342; B23B 31/2073
(Continued)

(56) References Cited

U.S. PATENT DOCUMENTS 3,040,606 A * 6/1962 Ericsson ............... B65B 13/345 81/313
3,194,281 A * 7/1965 Frey ...................... B65B 13/305 100/29
(Continued)

FOREIGN PATENT DOCUMENTS

CN 1622870 6/2005
CN 101698294 A 4/2010
(Continued)

OTHER PUBLICATIONS

Notification of Second Office Action prepared by the Chinese Intellectual Property Office in application No. 201880027183.2 dated Dec. 28, 2022. English translation included.
(Continued)

*Primary Examiner* — Thomas M Wittenschlaeger
*Assistant Examiner* — Katie L Gerth
(74) *Attorney, Agent, or Firm* — McDonnell Boehnen Hulbert & Berghoff LLP

(57) ABSTRACT

Various embodiments of the present disclosure provide a battery-powered stapling tool. A stapling tool includes a drive wheel, a slide comprising a first slide segment and a second slide segment, and a drive shaft receivable by the slide, wherein the drive shaft is coupled to and drivable by the drive wheel such that rotation of the drive wheel in a first rotational direction moves the drive shaft from the first slide segment to the second slide segment back to the first slide segment. The stapling tool further includes a lifting element,
(Continued)

wherein the lifting element defines the slide and is drivable by the drive shaft, and an ejector coupled to the lifting element and drivable by the drive shaft.

16 Claims, 30 Drawing Sheets

Related U.S. Application Data continuation-in-part of application No. PCT/IB2018/000458, filed on May 3, 2018.

(30) Foreign Application Priority Data

May 3, 2017 (CH) .................................... 00593/17
May 3, 2017 (CH) .................................... 00594/17
May 3, 2017 (CH) .................................... 00595/17

(58) Field of Classification Search
USPC .......................................................... 227/132
See application file for complete search history.

(56) References Cited

U.S. PATENT DOCUMENTS 3,333,608 A * 8/1967 Kuoni .................. B65B 13/345 140/93.2
3,396,760 A * 8/1968 Kirsinas ................ B65B 13/345 92/163
3,651,391 A 3/1972 Vogelsberg
4,245,678 A * 1/1981 Sansum ................ B65B 13/345 100/30
4,349,143 A 9/1982 Ewig
4,356,845 A * 11/1982 Kimbrough ............. H01J 29/87 100/32
4,491,262 A 1/1985 Ewig
4,550,643 A 11/1985 Schwartzenberger
4,716,813 A * 1/1988 Prudencio ............. B25C 5/0271 91/417 A
4,791,968 A * 12/1988 Pearson .................. B65B 13/30 100/29
5,197,647 A 3/1993 Howell
5,261,587 A 11/1993 Robinson
5,263,626 A 11/1993 Howard et al.
5,285,708 A 2/1994 Bosten et al.
5,346,114 A * 9/1994 Udagawa .............. B25C 5/1627 227/129
5,413,266 A * 5/1995 Jairam .................. B25C 5/0228 227/129
5,605,268 A * 2/1997 Hayashi .................... B25C 5/15 227/8
5,685,473 A 11/1997 Shkoinikov et al.
5,794,831 A 8/1998 Velan et al.
5,806,750 A * 9/1998 Yamanushi ............... B27F 7/36 227/155
5,911,350 A 6/1999 Bolger et al.
5,927,585 A * 7/1999 Moorman ................. B25C 1/06 227/8
5,933,288 A 8/1999 Plesko
5,967,397 A 10/1999 Fealey
5,996,460 A 12/1999 Waite
6,371,352 B1 * 4/2002 Mochizuki ................ B27F 7/38 227/155
6,422,272 B1 * 7/2002 Crittenden ............ B65B 13/188 140/150
6,695,192 B1 2/2004 Kwok
6,739,490 B1 5/2004 Shkolnikov et al.
6,786,380 B2 9/2004 Driscoll et al.
6,808,101 B2 10/2004 Laubach et al.
6,820,790 B2 * 11/2004 Ura ....................... B25C 5/0228 227/155
6,971,567 B1 * 12/2005 Cannaliato ................ B25C 1/06 173/205
6,997,367 B2 2/2006 Hu
7,163,134 B2 1/2007 Moeller et al.
7,191,927 B2 3/2007 Segura
7,341,172 B2 3/2008 Moore et al.
7,562,801 B2 7/2009 Pelletier et al.
8,104,659 B2 1/2012 St. John et al.
8,348,118 B2 1/2013 Segura
8,359,960 B2 1/2013 Ushiwata et al.
8,511,961 B2 8/2013 Gabriel et al.
8,550,323 B2 * 10/2013 Fujimoto .................. B25C 1/06 227/8
8,636,185 B2 1/2014 Largo et al.
8,777,078 B2 7/2014 Kakuda et al.
8,827,132 B2 9/2014 Mina et al.
9,114,494 B1 8/2015 Mah
9,272,799 B2 * 3/2016 Figiel .................... B65B 13/305
9,636,811 B2 5/2017 Segura
10,464,699 B2 * 11/2019 Figiel .................... B65B 13/187
10,577,137 B2 * 3/2020 Nasiatka ............... B65B 13/345
10,661,419 B2 * 5/2020 Takahashi ................. B27F 7/19
10,688,641 B2 * 6/2020 Weigmann ............. B25C 1/008
2001/0029819 A1 10/2001 Okouchi
2002/0162978 A1 11/2002 Butler et al.
2003/0000355 A1 1/2003 Butler et al.
2003/0202851 A1 10/2003 Kovarik
2004/0060959 A1 * 4/2004 Ura ........................... B27F 7/19 227/155
2005/0082334 A1 4/2005 Hu
2005/0145666 A1 7/2005 Lat et al.
2007/0170868 A1 7/2007 Wu
2007/0209197 A1 9/2007 Kciuk et al.
2008/0179371 A1 7/2008 Gardner et al.
2009/0242604 A1 * 10/2009 Mina ....................... B25C 1/047 227/8
2011/0132058 A1 * 6/2011 Barlasov ............... B25B 27/146 72/372
2011/0132959 A1 * 6/2011 Hlinka ...................... B25C 1/06 227/8
2011/0148437 A1 6/2011 Lawrence et al.
2012/0174525 A1 * 7/2012 Hinshaw ................... B25C 1/00 52/749.1
2014/0001226 A1 * 1/2014 Scabin ...................... B25C 5/04 227/108
2014/0001227 A1 * 1/2014 McNeill ................ B25C 5/0271 227/120
2014/0299646 A1 10/2014 Webb
2014/0338948 A1 11/2014 Hester et al.
2015/0060513 A1 3/2015 Young
2015/0136829 A1 * 5/2015 Howes ...................... B25C 1/04 227/140
2015/0282337 A1 10/2015 Ekstrom et al.
2016/0114470 A1 4/2016 Weigmann et al.
2016/0136797 A1 5/2016 Weigmann et al.
2016/0207185 A1 7/2016 Garber et al.
2016/0279774 A1 9/2016 Moore et al.
2016/0319537 A1 * 11/2016 Rinne ..................... B32B 5/024
2017/0232598 A1 8/2017 Largo et al.

FOREIGN PATENT DOCUMENTS

CN 102036787 4/2011
CN 102085652 6/2011
CN 102407516 A 4/2012
CN 101898350 12/2020
DE 10132995 1/2003
EP 2679344 1/2014
EP 2842695 4/2015
EP 3007197 4/2016
GB 540611 10/1941
JP S54-109188 8/1979
JP H07-033575 6/1995
JP 10258469 9/1998
JP 2001-293669 10/2001
JP 2003-260675 9/2003

(56) References Cited

FOREIGN PATENT DOCUMENTS

| | | |
|---|---|---|
| JP | 2011-520635 | 7/2011 |
| WO | 2009/078808 | 6/2009 |

OTHER PUBLICATIONS

Notice of Reasons for Refusal prepared by the Japanese Patent Office in application No. 2019-558629 dated Dec. 14, 2022. English translation included.
Notification of Reason for Refusal prepared by the Korean Intellectual Property Office in application No. 10-2019-7031476 dated Jul. 12, 2022. English translation included.
Notice of First Review Opinion prepared by the Chinese Patent Office in application No. 201880027183.2 dated May 7, 2022. English translation included.
EP Examination Report from corresponding EP Patent Application No. 18730430.8 dated Mar. 25, 2021.
Non-Final Office Action dated Feb. 19, 2021 in related U.S. Appl. No. 16/588,368 and art cited therein.
International Search Report and translation for PCT/IB2018/000458 dated Aug. 24, 2018.
Written Opinion for PCT/IB2018/000458 dated Nov. 12, 2018.
Notice of Reasons for Refusal prepared by the Japanese Patent Office in application No. 2019-558629 dated May 25, 2022.
Notification of Third Office Action prepared by the Chinese Intellectual Property Office in application No. 201880027183.2 dated May 9, 2023. English translation included.
Office Action prepared by the Taiwan Patent Office in application No. 11220856250 dated Aug. 30, 2023 English translation included.
Reject Decision prepared by the Chinese Patent Office in application No. 201880027183.2 dated Aug. 22, 2023 English translation included.

* cited by examiner 4
26
1
3
25
3a
7
7a
27
2
10
11
1a

X 2:1
Y 2:1
34
40
40a
40b
40c
41
42
45
49
50
51
51a
9
11
X
Y 29
18
17

STAPLING DEVICE

PRIORITY CLAIM

This application is a continuation of US Pat. No. 16,588,368, which was filed on Sep. 30, 2019, which is a continuation-in-part of and claims priority to and the benefit of PCT Application No. IB2018/000458, which was filed on May 3, 2018, which claims priority to and the benefit of: Swiss Patent Application No. 00591/17, which was filed on May 3, 2017; Swiss Patent Application No. 00592/17, which was filed on May 3, 2017; Swiss Patent Application No. 00593/17, which was filed on May 3, 2017; Swiss Patent Application No. 00594/17, which was filed on May 3, 2017; and Swiss Patent Application No. 00595/17, which was filed on May 3, 2017, the entire contents of each of which are incorporated herein by reference.

FIELD

The present disclosure relates to a portable stapling device, and particularly a battery-powered portable stapling device.

BACKGROUND

Certain known pneumatic stapling devices use a fluid, such as compressed air, to accelerate an ejector to contact and drive staples into objects. These pneumatic stapling devices are typically used to close cardboard boxes, but are also used in other industries, such as furniture manufacturing. While pneumatic stapling devices may differ based on their intended application, pneumatic stapling device typically include a piston movable in a cylinder between an upper-dead-center position and a lower-dead-center position. The ejector is positioned in the line of movement of the piston and is positioned and configured to contact and eject a staple from a magazine and into the object.

SUMMARY

Various embodiments of the present disclosure provide a portable stapling device. In certain embodiments, the stapling device comprises a drive wheel; a cam drivable by the drive wheel in a first rotational direction from a first position to a second position and back to the first position; a motor operably connected to the drive wheel to drive the drive wheel; a lifting element defining a slide in which the cam is received, the slide having first and second slide segments that are transverse to one another; and an ejector connected to the lifting element and drivable by the lifting element between a home position and an ejection position. The lifting element is movable between a home position and an ejection position. The ejector is in its home position when the lifting element is in its home position and in its ejection position when the lifting element is in its ejection position.

DETAILED DESCRIPTION

Figure 1:
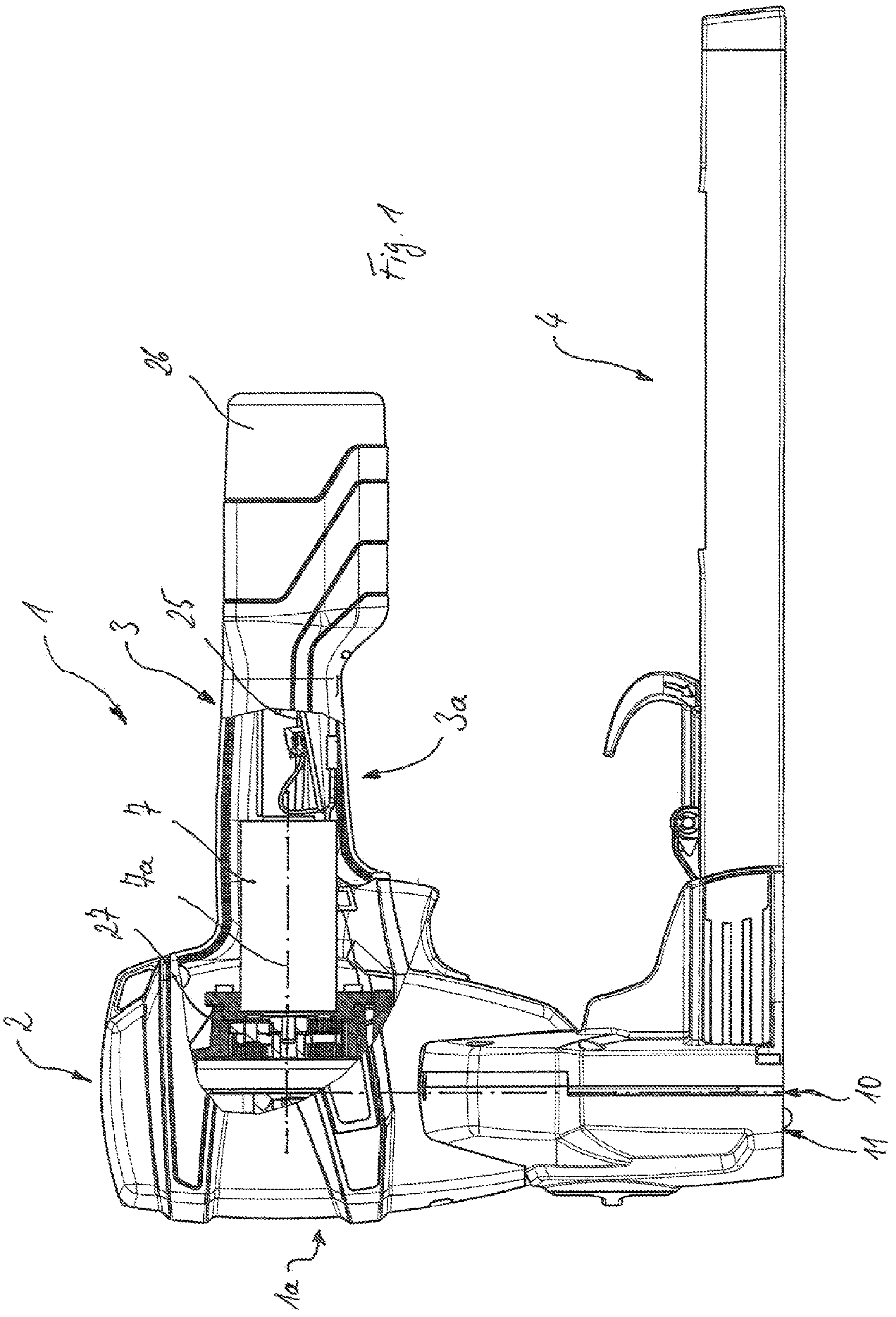
FIG. 1 is a partly sectioned representation of one example embodiment of a mobile portable stapling device of the present disclosure.
Figure 2:
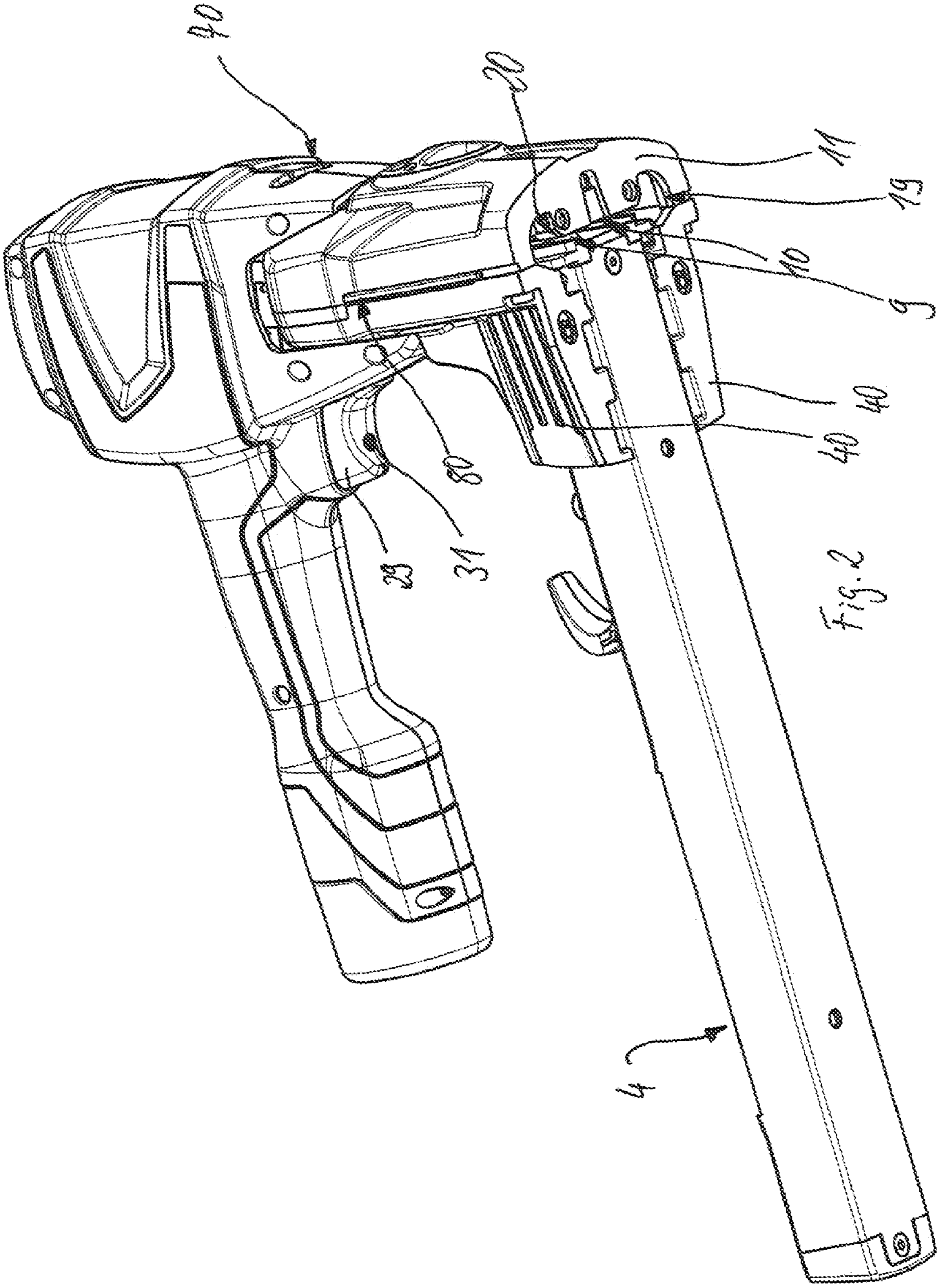
FIG. 2 is a perspective representation of the stapling device of FIG. 1.

FIG. 1 shows one example embodiment of the stapling device of the present disclosure in the form of a portable battery-powered stapler 1 for driving staples into objects. The housing comprises a main housing section 2 and a handle section 3, as will be further explained below. On the main housing section 2 there is arranged a removable magazine assembly 4 that is configured to hold a supply of staples. Inside the main housing section 2 is arranged a support 100 supporting or guiding an ejecting mechanism 6, which contains an ejector 8 driven by a motor 7. In its acceleration path the ejector 8 strikes against the foremost staple from the magazine 4, accelerates it, and pushes it out of an exit opening 10 of an ejecting channel 9. The exit opening 10 is situated in the area of a substantially flat contact surface 11 by which the stapler 1 is placed on the object to set a staple in the object with the stapler 1.

Figure 3:
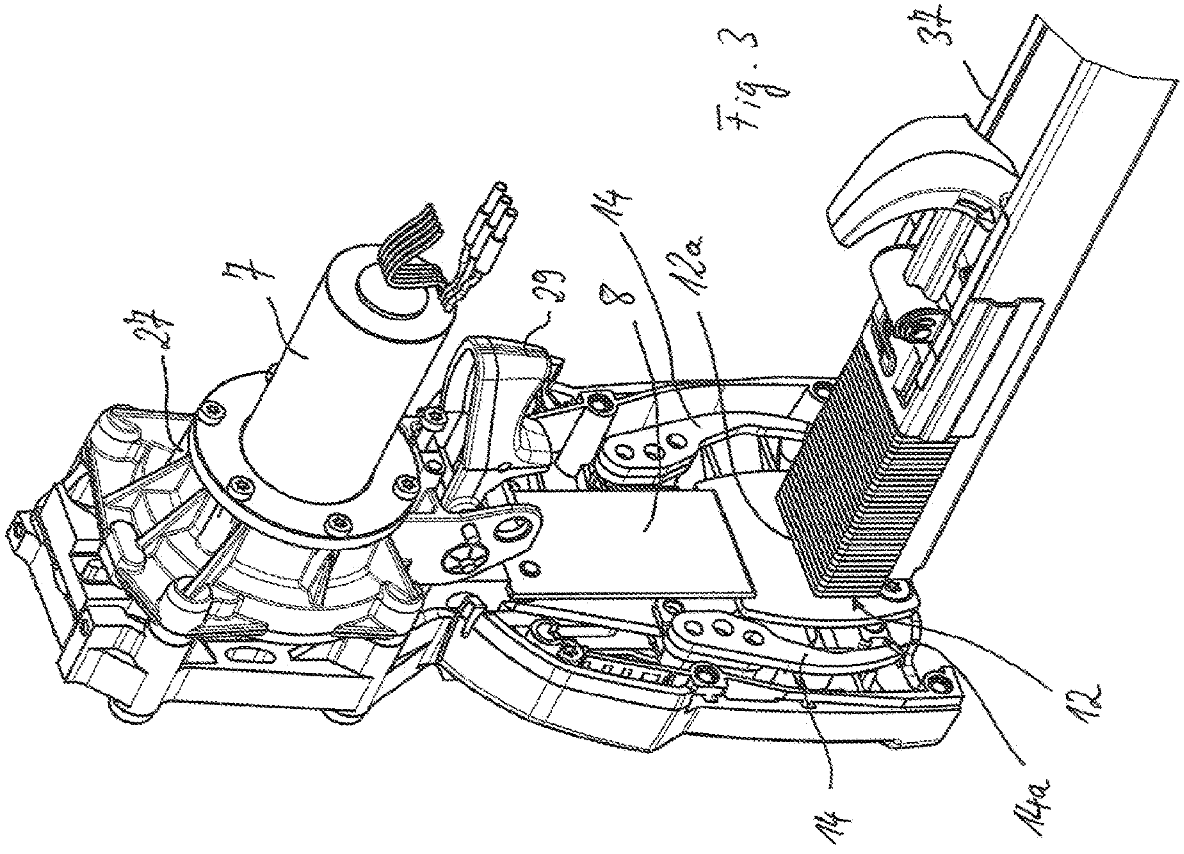
FIG. 3 is a perspective partial representation of the stapling device of FIG. 1.
Figure 5:
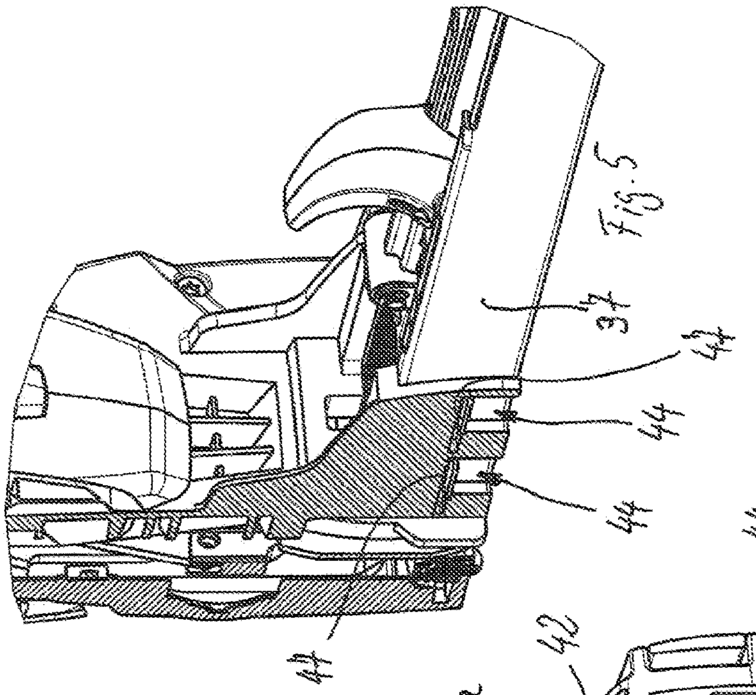
FIG. 5 is a representation per FIG. 4 during insertion of the magazine into the stapling device.
Figure 4:
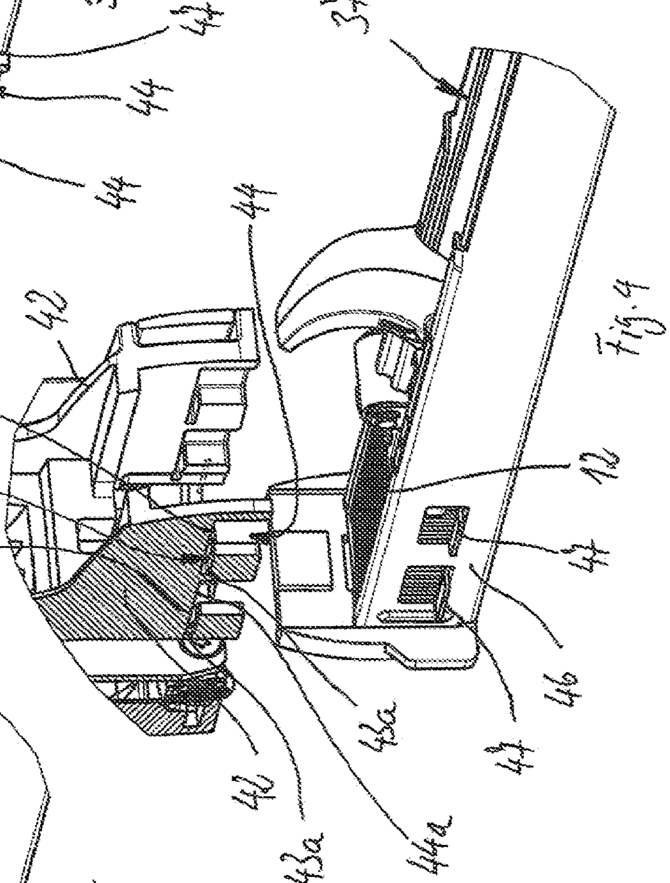
FIG. 4 is an exploded partial representation of the stapling device of FIG. 1 with its guide for a bayonet type arrangement and guidance of a magazine on the stapling device.
Figure 6:
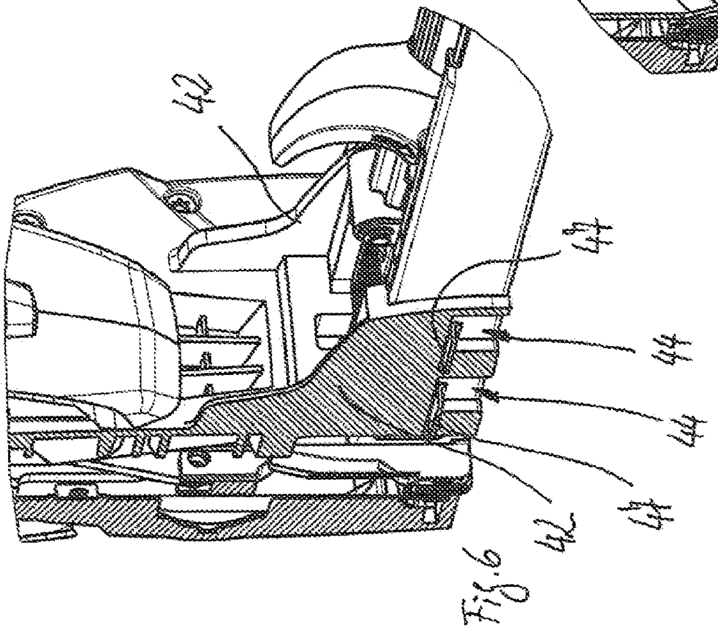
FIG. 6 is a representation per FIG. 5 with the magazine in its end position.

In the present case, the stapler is used for the closing of cardboard boxes. It therefore comprises two so-called clinchers 14 (FIG. 3) that are synchronized in their movement with the movement of the ejector 8 and are driven in their movement into the cardboard box to bend the two legs of the respective staple in the direction of a base leg of the staple, as described below with reference to FIGS. 35A-35F.

The housing may be made from a castable or injection moldable plastic and have two halves that can be joined by screws or other fasteners. Each housing half thus has a portion of the main housing section 2 and a portion of the handle section 3.

The ejecting mechanism 6 is driven by an actuator that, in this example embodiment, includes an electric motor. More particularly, the motor in this example embodiment is a brushless direct-current motor 7 positioned in the handle section 3 of the housing (though other types of motors or other actuators may be used). The handle section 3 is the section of the housing designed to be grasped by the hand of a user when the user is using the stapler 1 and guiding it by hand. This motor 7 is positioned and oriented, at least by one segment of its longitudinal extension, inside the handle section 3 roughly in a place where the handle section has a grip 3*a* on its outside, designed and intended for the placement of the operating hand and fingers of the operating hand of the user. In the area of the grip 3*a*, the user grasps the handle section 3 and in this way can activate in ergonomically favorable manner a trigger 29 situated in the area of the grip 3*a* with the user's index finger. The trigger 29 is thus located immediately next to the motor 7. By activating the trigger 29, the ejection of a staple can be set in motion.

Furthermore, a power electronics board 25 is located in the handle section 3 and is configured to control the motor 7 and to regulate the motor current. A free end of the handle section 3 defines a receptacle for an insertable and removable rechargeable storage battery 26. In the exemplary embodiment, the power electronics board 25 is located between the storage battery 26 and the motor 7. The necessary wiring 30 between the storage battery 26 and the power electronics board 25 and that between the power electronics board 25 and the motor 7 is likewise located in the handle section 3 of the housing.

As can be seen from FIG. 1, the axis of rotation 7*a* of the motor 7 is oriented at least roughly parallel to the contact surface 11 of the stapler 1. As can likewise be seen in FIGS. 1 and 35A-35F, the axis of rotation 7*a* of the motor 7 is oriented at least generally perpendicular to the movement axis MA along which the ejector 8 moves during stapling, as described below. The motor 7 is attached to a planetary gearing 27, by which the speed of the motor 7 is reduced, i.e., slowed down. The axis of rotation of the planetary gearing 27 at the output side of the gearing 27 is aligned with the motor rotation axis 7*a*. The drive motion at the output side of the gearing 27 drives a drive shaft 101 of the ejecting mechanism 6 that in turn drives the ejector 8 and the clinchers 14 (via several intermediate components, as described below). The motor rotation axis 7*a* has approximately the same distance from the contact surface 11 as a point of application of the motor rotational movement from the gearing 27 or the motor 7 to the ejecting mechanism 6.

The ejecting mechanism 6 is situated in the main housing section 2 and at least partially supported by the support 100. The ejecting mechanism 6 comprises a drive shaft 101 with a cam 105 connected thereto. The drive shaft 101 and the cam 105 are driven in rotation by the motor 7. More specifically, the drive shaft 101 is connected to a drive wheel (not shown) of the planetary gearing 27 and is radially spaced from a rotational axis of the drive wheel. In other words, the drive shaft 101—and therefore the cam 105—is eccentrically mounted to the drive wheel so rotation of the drive wheel in one rotational direction drives the cam 105 in rotation from a first, upper-dead-center position (FIGS. 35A and 35F) to a second, lower-dead-center position (FIG. 35C) and then back to the upper-dead-center position (during one full 360-degree rotation of the drive wheel). The cam 105 is received in and guided by a slide 112 defined in a lifting element 110. The lifting element 110 is movable relative to the support 100 between a home (or upper) position (FIGS. 35A and 35F) and an ejection (or lower) position (FIG. 35D). As described in detail below, rotation of the cam 105 from its upper-dead-center position to its lower-dead-center position and back to its upper-dead-center position causes the lifting element 110 to move from its home position in a direction D to its ejection position and then in an opposite direction U back to its home position. The movement axis MA is longitudinally aligned with the ejecting channel 9 and laterally centered in the ejecting channel 9. As will be described in detail below, the lifting element 110 is in its home position when the cam 105 is in its upper-dead-center position, but the lifting element 110 is not in its ejection position when the cam 105 is in its lower-dead-center position. Rather, the lifting element 110 reaches its ejection position as the cam 105 is returning from its lower-dead-center position to its upper-dead-center position. This means that the cam 105 applies a force on the lifting element 110 in the direction D for more than half of the travel of the cam 105.

The slide 112 has a first slide segment 112*a* defined (in part) by upper and lower first-slide-segment walls (not labelled) and an adjacent second slide segment 112*b* defined (in part) by upper and lower second-slide-segment walls (not labelled). The first slide segment 112*a* is transverse to the movement axis MA, and the second slide segment 112*b* is transverse to the first slide segment 112*a* and the movement axis MA. In other words, the movement axis MA, the first slide segment 112*a*, and the second slide segment 112*b* are transverse to one another. In this example embodiment, the second slide segment 112*b* is substantially perpendicular to the movement axis MA, and the first and second slide segments 112*a* and 112*b* form an oblique angle, though other variations are contemplated.

One end of a transmission rod 120 is connected to the lifting element 110, and the other end of the transmission rod 120 is connected to a guide element 130. One end of the ejector 8 is connected to the guide element 130. The transmission rod 120, the guide element 130, and the ejector 8 are movable with the lifting element 110 between respective home (or upper) positions and ejection (or lower) positions. The ejector 8 in its motor driven path is designed to make contact with the most forward staple 12 of the staple supply located in the ejecting channel 9 by an end of the ejector 8 facing away from the guide element 130 and by the end face which is provided there, as described below.

Two clinchers 14 are fixedly connected to respective clincher mounts 150 on opposite sides of the ejecting channel 9. The clincher mounts 150 are rotatably connected to one another and to the support 100 at their lower ends so the clincher mounts 150 are rotatable relative to one another and relative to the support 100 about a clincher-mount-rotational axis (not shown). The upper ends of the clincher mounts 150 are rotatably connected to the guide element 130 by respective clincher-mount linkages 140. Each of the clinchers 14 has at its free end a blade 14*a*. The clincher mounts 150 and respective clinchers 14 are rotatable between respective home positions (FIGS. 35A and 35F) and bending positions (FIG. 35D).

Figure 35A:
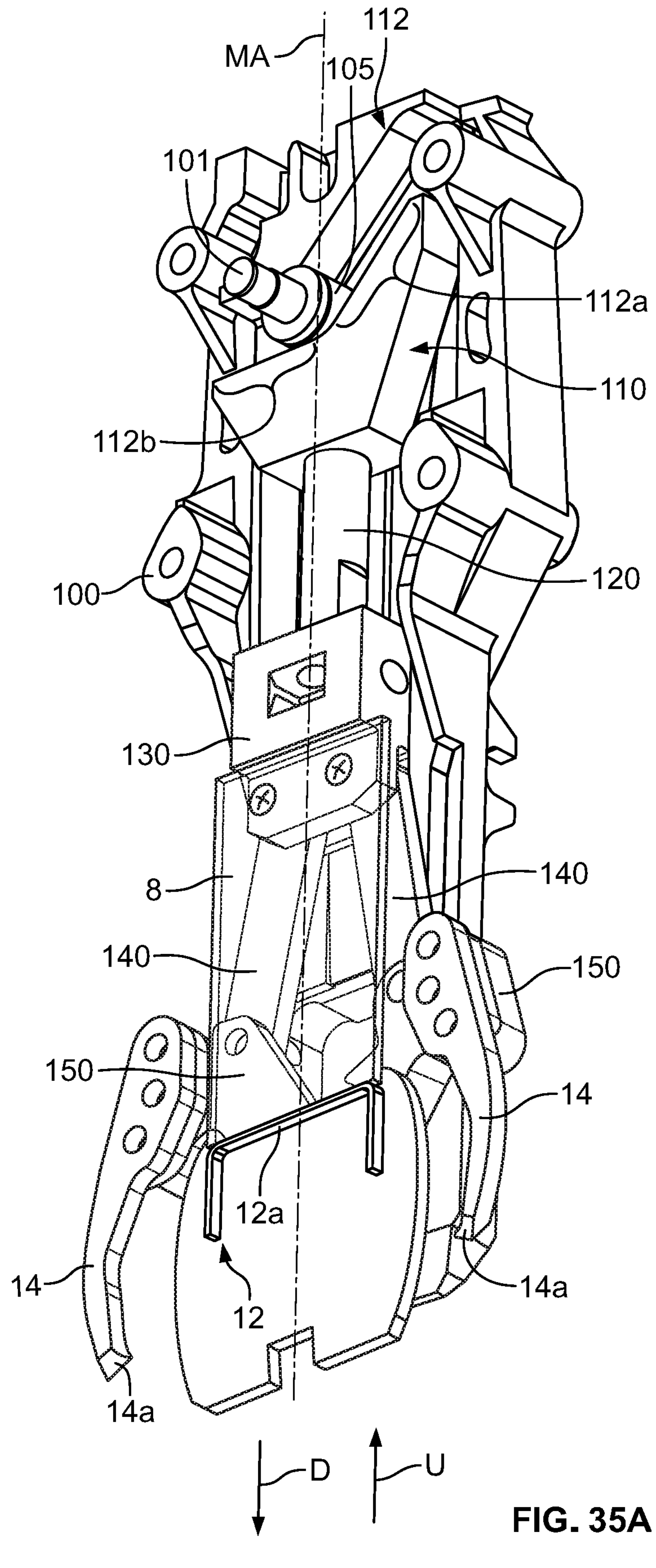
FIGS. 35A-35F are perspective views of part of the stapling device showing the stapling device carrying out a stapling process.
Figure 35B:
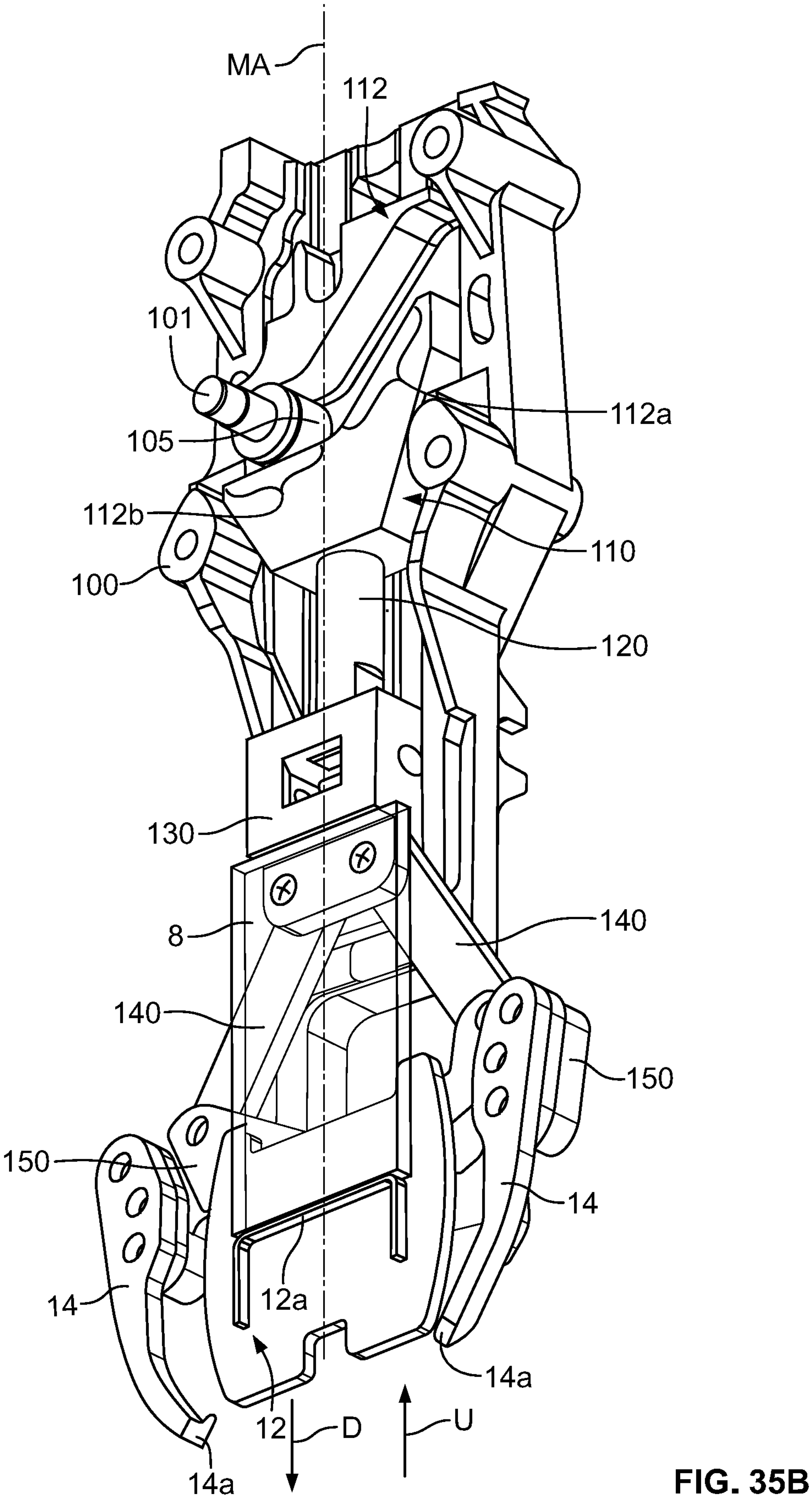
Figure 35C:
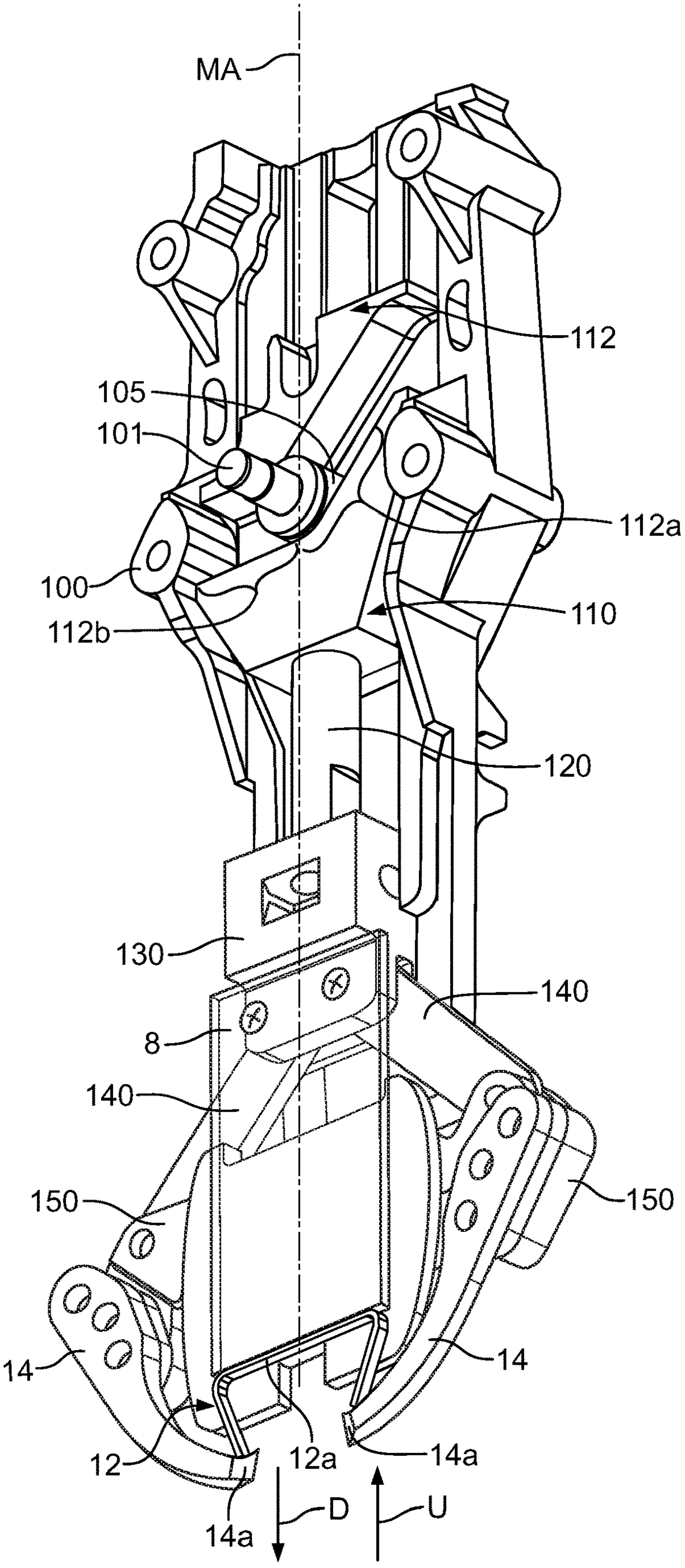
Figure 35D:
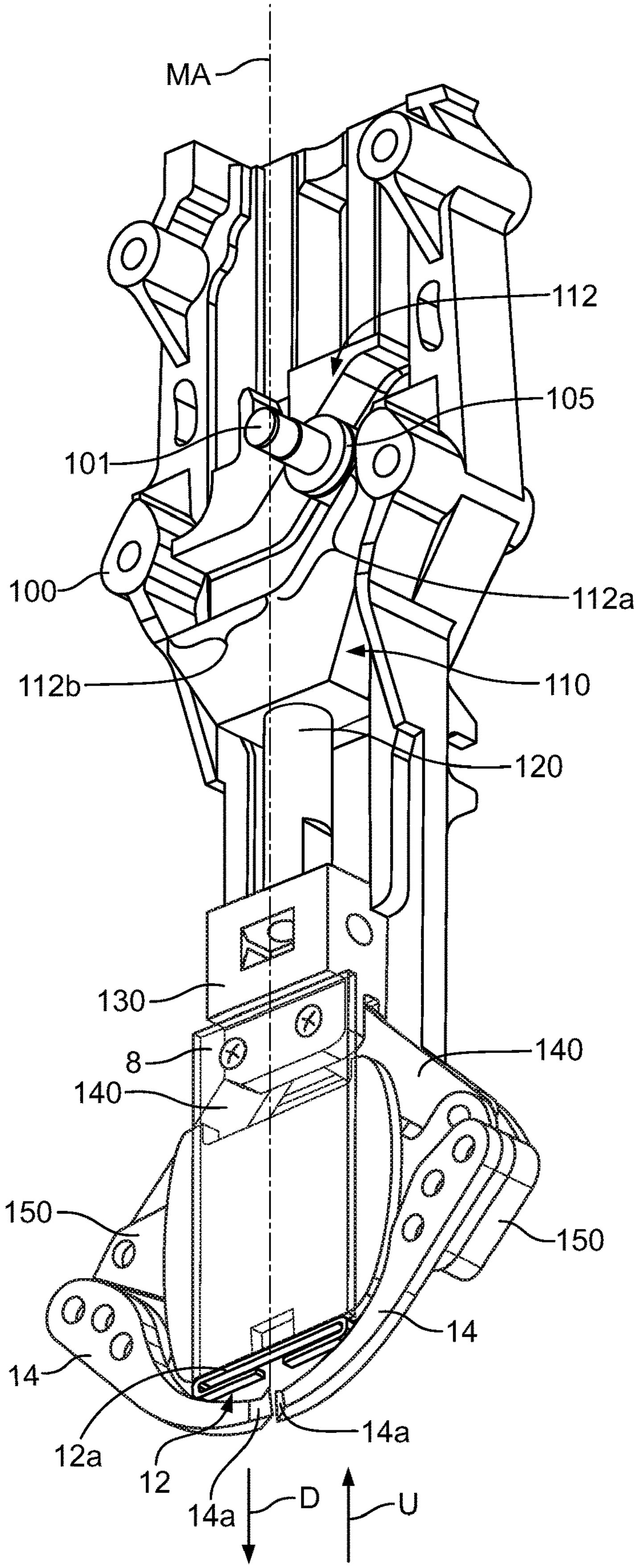

FIGS. 35A-35F show the above-described components during the process of driving and bending a staple 12. Initially, the lifting element 110, the transmission rod 120, the guide element 130, and the ejector 8 are at their respective home positions; the cam 105 is in its upper-dead-center position and within the second slide segment 112*b*; and the clinchers 14 are in their respective home positions, as shown in FIG. 35A. The motor 7 begins driving the drive wheel in rotation, which in turn begins driving the drive shaft 101 and the cam 105 in rotation (in the counterclockwise direction with respect to the views shown in FIGS. 35A-35F) from its upper-dead-center position toward its lower-dead-center position. As this occurs, the cam 105 exerts a force on the lower second-slide-segment wall in the direction D. This drives the lifting element 110, the transmission rod 120, the guide element 130, and the ejector 8 toward their respective ejection positions, and movement of the guide element 130 toward its ejection position causes the clinchers 14 to begin moving toward their bending positions, as shown in FIG. 35B. As the ejector 8 moves toward its ejection position, it contacts and begins driving a staple 12 in the direction D.

As the cam 105 continues moving to its lower-dead-center position and the lifting element 110, the transmission rod 120, the guide element 130, and the ejector 8 move toward their respective ejection positions, the clinchers 14 continue to rotate toward their bending positions and penetrate the object, here the cardboard box. Continued movement of these elements toward their respective ejection and bending positions results in the clinchers 14 contacting and bending the two legs of the staple 12 toward the base leg 12A of the staple 12. As shown in FIG. 35C, as the cam 105 reaches its lower-dead-center position, the clinchers 14 have begun—but not completed—bending the legs of the staple 12 and have not yet reached their bending positions, and the lifting element 110, the transmission rod 120, the guide element 130, and the ejector 8 have not yet reached their respective ejection positions. At this point the cam 105 is still in the second slide segment 112*b* and is adjacent the first slide segment 112*a*.

As the cam 105 begins rotating (in the same rotational direction, here counterclockwise) back toward its upper-dead-center position, the cam 105 enters the first slide segment 112*a*. The first slide segment 112*a* is oriented so the cam 105 initially exerts a force on the lower first-slide-segment wall in the direction D. As a result, the lifting element 110, the transmission rod 120, the guide element 130, and the ejector 8 continue moving in the direction D and eventually reach their respective ejection positions, as shown in FIG. 35D. As this occurs, the clinchers 14 reach their bending positions and finish bending the legs of the staple 12, thereby fixing the staple 12 against being simply pulled out from the cardboard box. Usually a stapler of this kind is arranged by its contact surface 11 on the cardboard box so that one leg of the staple 12 pierces one of the two foldable flaps of the cardboard box by which the cardboard box is to be closed. But many other applications are possible, such as stapling overlapped flaps of a cardboard box.

Figure 35E:
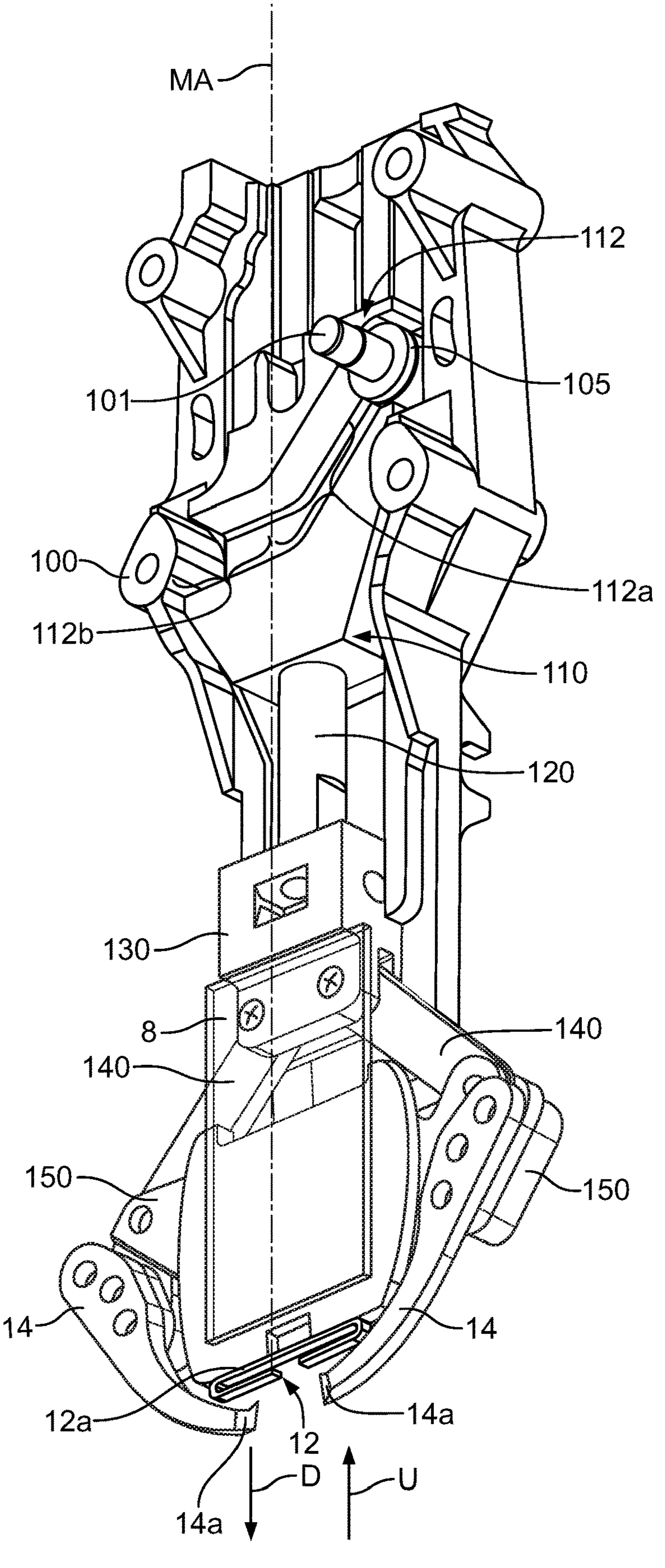
Figure 35F:
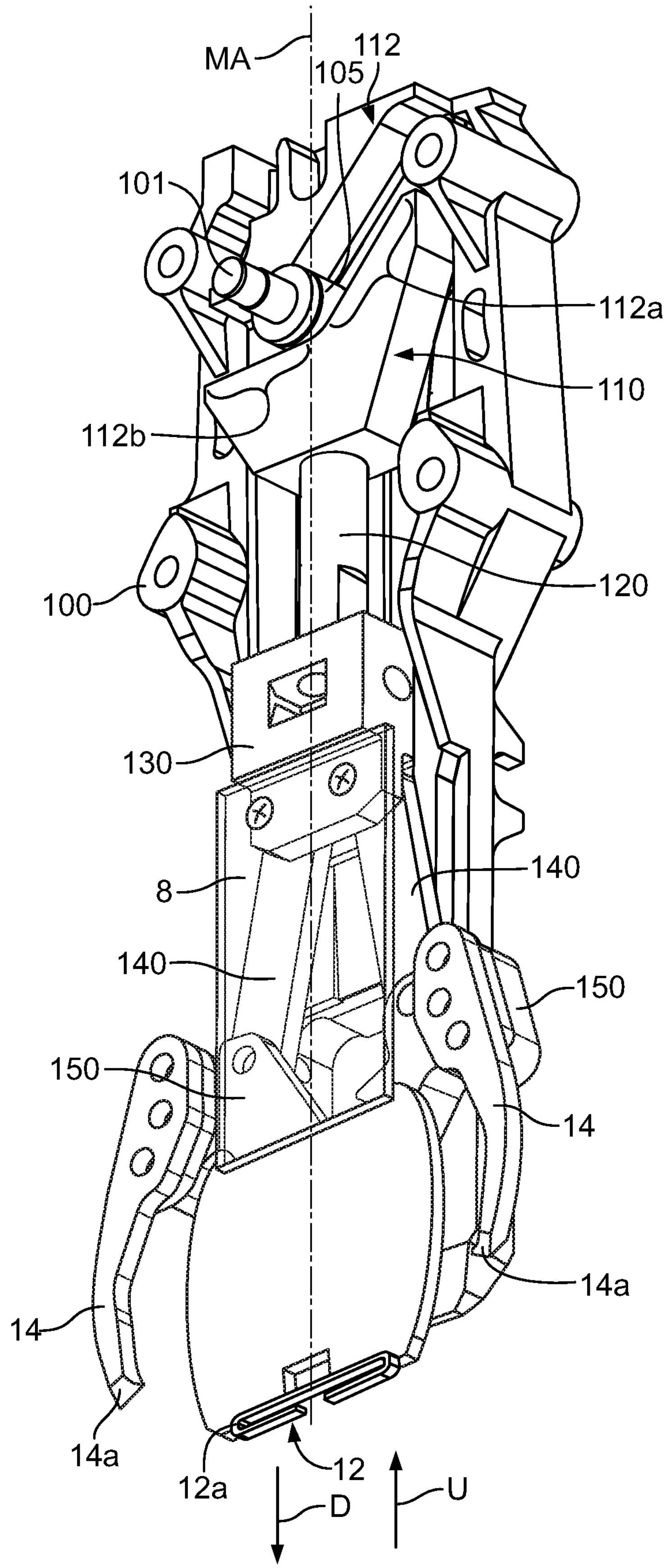

The first slide segment 112*a* is shaped such that after the lifting element 110, the transmission rod 120, the guide element 130, and the ejector 8 reach their respective ejection positions and the clinchers 14 reach their bending positions, the cam 105 begins exerting a force on the upper first-slide-segment wall of the lifting element 110 in the direction U. This occurs at about three-quarters of a full rotation of the cam 105. This causes the lifting element 110, the transmission rod 120, the guide element 130, and the ejector 8 to begin moving from their respective ejection positions back to their respective home positions and the clinchers 14 to begin moving from their bending positions back to their home positions, as shown in FIG. 35E. This continues until, as shown in 35F, the cam 105 reaches its upper-dead-center position and the lifting element 110, the transmission rod 120, the guide element 130, the ejector 8, and the clinchers 14 reach their respective home positions. The downward and upward stroke movements of the lifting element 110 thus follow the same path along the movement axis MA, but in reversed movement direction.

The use of and shape of the slide 112 provides several benefits over prior art stapling tools. Specifically, the slide 112 is shaped so force is applied to the lifting element 110 in the direction D (i.e., to move the lifting element 110 to its ejection position) over more than half of a full rotation of the cam 105, and in certain embodiments about three-quarters of a full rotation of the cam 105. This results in a more constant and smooth load on the motor and the planetary gearing as compared to certain prior art tools in which force is applied over only half of a full rotation of the cam. This results in less wear on these components (increasing their life span), lower current peaks and a more equal current distribution (resulting in less electrical loss through heating and a lower thermal load on the electronics), and less battery usage per cycle (meaning an increased number of cycles per charge or that smaller batteries can be used without a reduction in cycles per charge). It also allows for the use of the tool in lower-temperature applications and for the tool to be adapted for other types of staples via modification of the shape of the slide and without requiring modification of the motor or gearing.

Turning now to features of the trigger 29, the trigger 29, has a detecting device 31 configured to detect a body part, such as a finger, placed on the trigger 27. This detecting device 31 can be arranged either on the trigger 29 directly or on the housing of the stapler 1 in direct proximity to the trigger 29. The detecting device 31 may be a proximity sensor, a photodiode, or a photoresistor. By way of a signal cable laid in the housing, a detection signal of the detecting device 31 can be directed to a control system of the stapler 1, the control system being configured such that the detection signal is a prerequisite for enabling the ejecting of a staple.

Finally, the trigger 29 can be activated against the spring forces of at least two spring elements 17, 18. When the trigger 29 is activated, this occurs at first only against the spring force of the first spring 17 and only during the further activation of the trigger does the second spring 18 also act with its spring force against the trigger 29. As soon as the second spring 18 on account of a further activation path of the trigger 29 presents its spring force also as a compression spring against the further pressing of the trigger 29, the spring forces of both spring elements 17, 18 are then acting and the trigger now has to be activated against both spring elements 17, 18.

Detecting devices 19, 20 are located in the area of the contact surface 11 of the stapler 1 on either side next to the exit opening 10. The detecting devices 19, 20 are configured to detect the presence of an object directly underneath the contact surface 11 and thus beneath the exit opening 10. Thus, these two detecting devices 19, 20 (sensors) are configured to detect whether the stapler is arranged on an object into which a staple 12 can be delivered. In certain embodiments both detecting devices 19, 20 must detect the object and each provide a corresponding signal to the control system for the control system to enable the ejecting of a staple 12. In this way, one can prevent the ejecting of staples with no appropriate object being present. By having at least one detecting device 19, 20 at each end face of the exit opening 10, it can furthermore be detected whether the entire exit opening 10 or only a portion thereof is located on an object. The at least two detecting devices 19, 20 thus have a spacing from each other that is larger than the length of the exit opening 10. Also in this way it can be prevented that staples will be ejected and have only one leg in an object, thus not being able to fulfill their intended function.

The two detecting devices 19, 20 are in some embodiments optical sensors. In other embodiments mechanical sensors or sensors based on other functioning principles can also be provided. Besides other optical sensors, sensors may be suitable which emit light and detect a reflecting of the emitted light, for example. Such optical proximity sensors have long been available in many different designs.

Finally, the figures also contain representations showing other embodiments of a stapler in which mechanical contact switches are provided instead of optical detecting devices in the contact surface 11 as detecting devices 119, 120. These detecting devices 119, 120 may at least be situated in substantially the same places of the contact surface 11 at which the optical detecting devices 19, 20 are provided.

In certain embodiments, the stapler 1 has a semiautomatic mode and/or a fully automatic mode in addition to a single shot mode in which only one staple is driven per activation of the trigger 29. This semiautomatic mode may be switched on and off at a display/control device of the stapler 1 each time by activating a button, here a button of a membrane keypad 33. By switching on the semiautomatic mode, after a onetime activation of the trigger 29 a stapling process is possible each time as long as certain conditions are fulfilled for the individual automatically occurring stapling processes. Such conditions may be, in particular, that both the detecting device 31 of the trigger 29 detects a finger and the detecting devices 19, 20 detect an object in the area of the exit opening 10. If such detection signals of the detecting devices 19, 20, 36 are absent, it may be arranged that no enabling will occur for a first staple 12. But if a first staple has been enabled and thus ejected on account of such detection signals, then no further activating of the trigger is needed in this operating mode for the output of further staples.

Thus, conditions for the triggering of a stapling process in the semiautomatic mode may be, for example, that it is ascertained by detection devices that the contact surface is located on a surface of an object. After performing the first stapling process in semiautomatic mode, it may likewise be a condition for a following stapling process of the same ejection series in semiautomatic mode that the detection devices 19, 20 have detected an interim removal of the contact surface 11 from the object and then once more the presence of the object in the area of the contact surface 11. In other words, it must be detected that the stapler was lifted off from the object and set back down. It may likewise be provided that a further detection device is used to determine that an operator has placed a finger on the trigger, but without the operator having to activate the trigger. In other alternative embodiments, however, it may also be provided that a series of staple ejections can only occur in the semiautomatic mode if the trigger 29 is activated without interruption.

It is possible for detection devices, such as optical proximity sensors in particular, to signal the presence of an object already when the particular sensor is in the immediate proximity of the respective object, but no contact exists as of yet between the stapler and the object. To prevent staples from being ejected too early in the semiautomatic mode, i.e., at times when the stapler is not yet fully situated by its contact surface 11 on the object, a time delay after such detection signals may be provided for the respective staple ejection. The time delay may either be stored as a fixed time value in the control system or it may be adjustable by an operator on the stapler, especially adjustable from a time value from a range. Possible time delays may be values from a range of 5 milliseconds to 350 milliseconds, but preferably from a range of 10 milliseconds to 200 milliseconds. In the exemplary embodiment, a value of 50 milliseconds is provided.

Besides the manual operating mode in which each time an activation of the trigger is required for each individual staple ejection, there is alternatively or possible in addition to the semiautomatic mode a (fully) automatic mode. In this third operating mode of the stapler that can be set in place of the other two operating modes, after detection of the fulfillment of at least one enable condition and after activation of the trigger 29, staples can be ejected for as long as the trigger 29 remains activated or depressed and the contact surface 11 is present without interruption on an object. In this way, for example, it is possible and intended for the stapler 1 to be pulled across an object, each time there occurring the ejecting of a staple from a series of staple ejections after a certain time interval. As soon as the trigger 29 is released and/or the stapler is lifted off from the object, the control system halts the ejecting of further staples.

Finally, in conjunction with the automatic mode it may also be provided that the time interval between one staple ejection and the immediately following staple ejection can be changed. In one possible embodiment, this interval may be set on the stapler 1 by a user by a corresponding entry as a value. Alternatively or additionally, in a further embodiment, it may be provided that the interval is dictated in a teach-in (learning) mode of the stapler. For this, the time interval during which a user ejects two staples by way of the stapler can be memorized in an adjustable teach-in mode. This interval is then used for the automatic mode. In this way, the automatic mode can be adapted to the work style and work pace of a user.

In the figures, the stapler 1 is shown with inserted magazine 37 of the magazine assembly 4 in a slanted bottom representation. There has been installed in the magazine a supply of staples 12, which is pressed by a spring-loaded pusher 38 in the direction of the ejecting channel 9 of the stapler. The frontmost one of the U-shaped staples 12 is thus always present in the ejecting channel 9, in which it is engaged by the ejector 8 during its to its ejection position, accelerated, and ejected from the exit opening 10.

In this representation of the figures, one may notice a swivel lever 40 and its swivel axis 41 on either side of the magazine 37, the swivel levers 40 and their swivel axes 41 belonging to a quick lock by which the magazine can be releasably secured to the stapler 1 and also removed by releasing the quick lock. Thus, a first and a second swivel lever 40 are located on opposite sides of the magazine, both of them able to swivel about their respective swivel axis 41. The two swivel axes 41 run parallel to each other and at least substantially perpendicular to the contact surface 11. Finally, the two swivel axes 41 are also oriented parallel to the longitudinal axis of the ejecting channel 9.

As is represented in the cross sectional representation of the figures, the main housing section of the stapler has two guide bodies 42 for the magazine 37, spaced apart from each other. Each of the two guide bodies 42 is provided with guide elements for the magazine, which is approximately rectangular in cross section. On their walls, the guide bodies 42 are provided with guide elements 43 for a movement of the magazine 37 parallel to the contact surface 11 and with one or more end stops to limit this movement. In the exemplary embodiment, these guide elements 43 are recesses running parallel to the contact surface 11, here being slotlike recesses, in the guide bodies. Each time the ends of the slotlike recesses serve as end stops 43*a* in the exemplary embodiment.

In the exemplary embodiment, the slotlike recesses pass into rectangular recesses of the walls of the guide body 44. The likewise rectangular recesses 44 also serve as guide elements for a definite guided relative movement between the magazine 37 and the housing of the stapler. The upper end face wall boundaries 44*a* of the recesses 44 constitute the end stops here for the movement guidance by way of the recesses 44 in the direction perpendicular to the contact surface. Thus, as seen from the bottom open rectangular shape of the recess 44, each of the two substantially rectangular recesses 44 in the area of the upper end face wall boundary adjoins the slot running parallel to the contact surface 11 and in the direction of the ejecting channel 9 as a guide element 43. In the exemplary embodiment described here, each of the two guide bodies thus has two identical guide elements 43, 44 arranged alongside each other.

The magazine 37 is provided with two brackets 47 spaced apart and arranged one behind the other in the area of its side walls 46 near the ejecting channel. The brackets 47 project perpendicular from the outer surfaces of the side walls 46 and when a magazine 37 is inserted into the stapler 1 they have a substantially parallel orientation to the contact surface 11. The brackets 47 are spaced apart from each other and dimensioned such that they can be arranged in the recesses of the guide elements 43, 44 of the guide body and can be moved there along the respective longitudinal extension of the recesses—and only along these longitudinal extensions. To attach a magazine 37 to the stapler 1, the brackets 47 are introduced from the bottom open side of the guide elements 44, so that the brackets 47 are shoved in the guide elements parallel to the contact surface 11 until the respective bracket 47 reaches the upper end (end stop) of the respective recess of the guide element 44. This movement direction is oriented perpendicular to the contact surface 11. Now the respective bracket 47 can be shoved parallel to the contact surface 11 into the respective slotlike recess of the respective guide element 43 until the brackets 47 reach their respective end stop 43*a* at the same time. The slots of the guide elements 43 and the thickness of the brackets 47 are dimensioned such that the brackets 47 after reaching their end stop 44*a* in the respective guide element 44 are introduced into the respective slot of the guide elements 43 and can now perform a movement substantially parallel to the contact surface. When inserting a magazine 37, the first movement of the magazine 37, or that of its brackets 47, in the recesses of the guide elements 44 and the second movement of the brackets 47 in the slots of the guide elements 43 are thus oriented perpendicular to each other. For the removal of the magazine from the stapler 1, the slots are led out from the guide elements 43, 44, now in the reversed movement direction, but along the same path. It is possible both when inserting and when removing a magazine 37 to also move the stapler 1 instead of the magazine 37 along the described path. The corresponding relative movements between the magazine 37 and the guide bodies 42 of the stapler 1 are what matter.

In each of the two guide bodies 42, one of the swivel axes 41 is led through the respective guide body 42 on both sides in the area of the magazine 37 and a spring element 49 preferably configured as a compression spring is arranged and braced against the guide body 42. The respective swivel axis 41 is arranged with a spacing from the spring element 49 (compression spring) and has a smaller distance from the ejecting channel 9 than the respective spring element 49 of the same side of the magazine. Each of the swivel axes 41 runs at least substantially perpendicular to the contact surface 11 of the stapler and also at least substantially parallel to the longitudinal axis of the ejecting channel 9. The swivel levers 40 which can pivot about their respective swivel axis 41 can thus execute swivel movements about this axis, lying substantially in a swivel plane running parallel to the contact surface 11. The respective swivel axis 41 is also led through one of the swivel levers 40.

The respective guide body 42 is situated between the magazine 37 and the swivel lever 40 belonging to this side of the magazine. At its outer side, each of the swivel levers 40 has a shoulder 50. The shoulder 50 is provided for bearing against a surface of a carrier body of the stapler 1 and thus serves to limit the depth of insertion of the magazine 37 in the stapler. Furthermore, each of the two swivel levers 40 is curved by its end at the ejecting channel side in the direction of the magazine 37 and provided with a profiled end face 45 (FIG. 7-12).

The stapler 1 has a rear plate 51 in the area of its magazine-side opening, which is also located in the area of the ejecting channel 9, which bounds the ejecting channel 9 at the magazine side when the magazine 37 has been inserted and is part of the magazine 37. The rear plate 51 extends on both sides beyond the rail of the magazine 37 in which staples 12 are stored. Side surfaces of the rear plate 51 are situated roughly at the height of the ends of the swivel levers 40 at the exit channel side. The end faces 45 of the swivel lever ends are each provided with two partial surfaces 40*a*, 40*b* making an obtuse angle, which interact with the respective side surface 51*a* of the rear plate 51.

Figures 7, 8, 9:
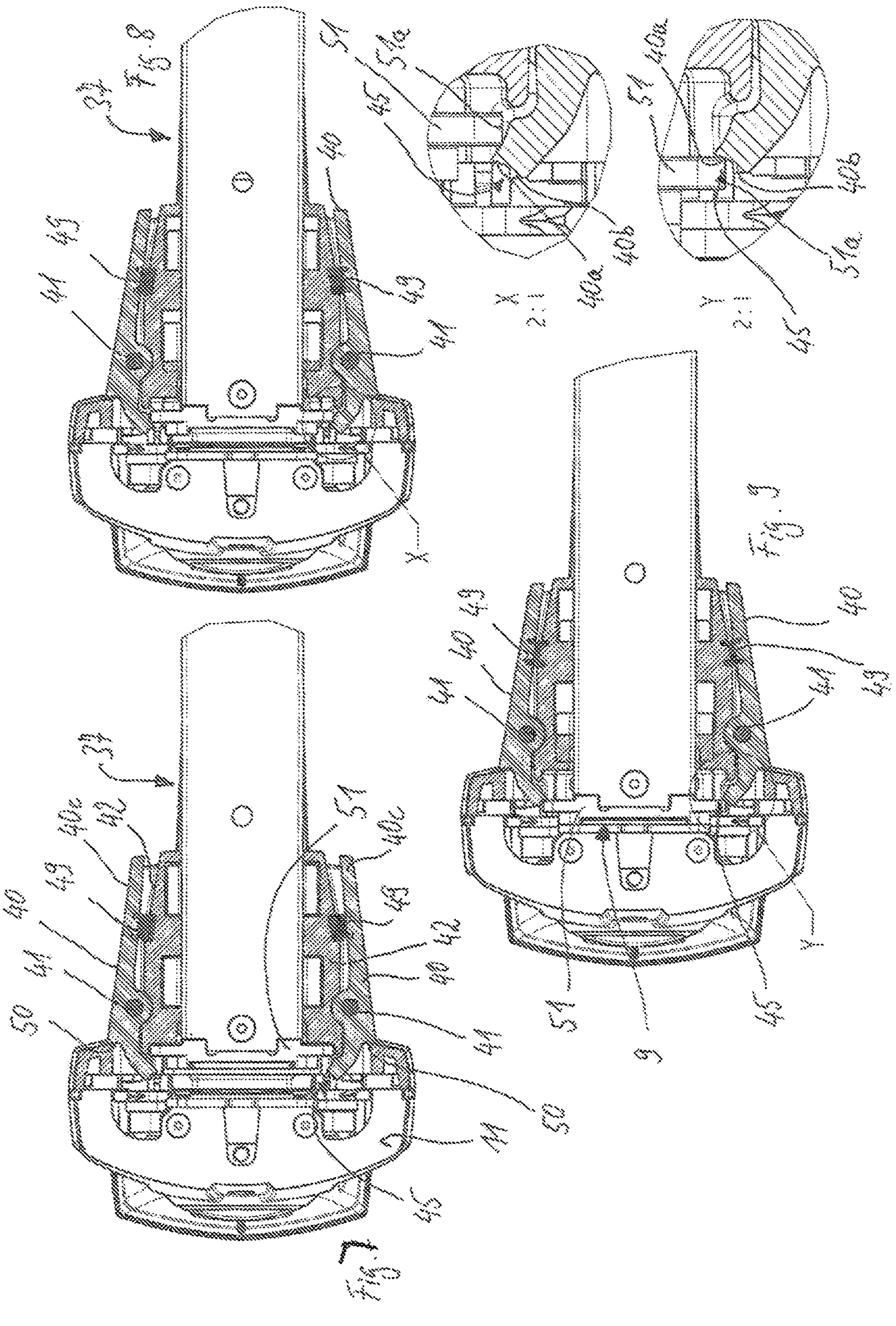
FIG. 7 is a representation of the stapling device from underneath, during insertion of the magazine.
FIG. 8 is a representation per FIG. 7, upon further insertion of the magazine.
FIG. 9 is a representation per FIGS. 7 and 8, with the magazine in its end position.
Figure 11:
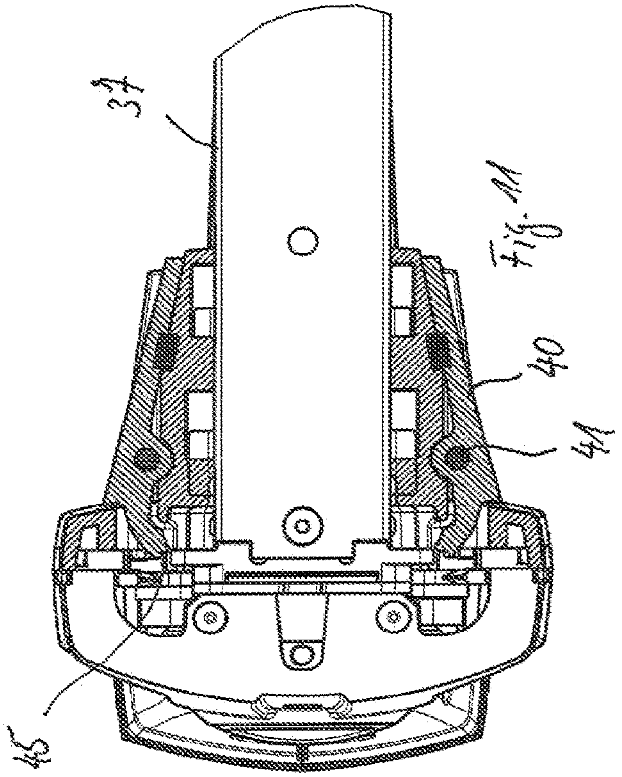
FIG. 11 is a representation per FIG. 10 upon beginning removal of the magazine from the guide.
Figure 12:
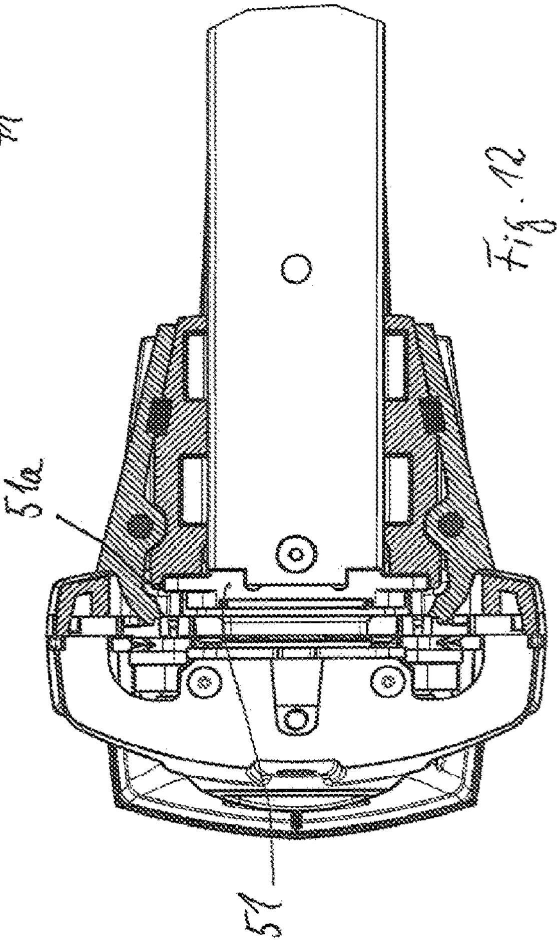
FIG. 12 is a representation per FIGS. 9 and 11 upon further removal of the magazine.

To release the magazine 37 secured in the stapler 1 and remove it, for example on account of a staple jam, or to refill the magazine 37, first of all the two swivel levers 40 have to be activated about their respective swivel axis 41 and against the spring force of the spring elements 49. In the case of an inserted magazine 37 locked at the quick lock, the rear sections 40*c* of the swivel levers 40 are at a distance from the respective guide body 42. These swivel lever sections 40*c* are pushed away from the guide body 42 by the spring element 49 in the form of a torque about the swivel axis 41. A resulting swivel movement of the swivel levers 40 is limited each time by an end stop of the shoulder 50 of the swivel levers 40 on the carrier body or on the housing of the stapler. An activating of the swivel levers 40 now results at first in a swivel movement about the swivel axis 41 against the spring force, so that the rear sections 40*c* of the swivel levers 40 come to bear against the guide body 42, as is shown in FIGS. 7, 8, 9. The profiled end faces of the front ends of the swivel levers 40 are lifted off by the rear plate 51 from their identical locking positions on the rear plate 51, in which the two partial surfaces 40*a*, 40*b* of the profiled end faces of the swivel levers 40, angled toward each other, thrust against an edge region of the end face of the rear plate 51. In this way, the magazine 37 is released for pulling out from the guide (guide elements 43, 44), and so the quick lock is loosened.

On the other hand, as long as the respective end face of the swivel levers 40 lies against the end face 51*a* of the rear plate 51 and the quick lock is not released by hand, the quick lock is locked with self-locking. A pulling on the magazine 37 has the result, due to the geometry of the front ends of the swivel levers 40, that the rear plate 51 has a tendency to swivel both swivel levers 40 about their swivel axes 41 against their direction of turning when loosening the quick lock. This results in an increasing of the holding forces exerted by the swivel levers 40 at the carrier side or housing side on the rear plate 51 at the magazine side.

After the quick lock has been loosened as described, the magazine 37 can be distanced from the housing with a movement running parallel to the contact surface 11. The direction of this movement is dictated by the slots of the guide elements 43 and the brackets 47 led therein. The movement is halted as soon as the brackets 47 strike against side boundary walls of the recesses of the guide elements 44. In this position, all the brackets 47 are situated with their entire longitudinal extensions inside the recesses of the guide elements 44, at their upper ends. By a movement of the brackets 47 inside the recesses of the guide elements 44 toward the open bottom end of the recesses or alternatively a movement of the recesses along the brackets 47, the magazine 37 can be entirely removed from the stapler. Thus, a simple and safe option of removing the magazine 37 may be to place the stapler 1 lying against a base by its contact surface 11 and the bottom of the magazine 37 and to activate the swivel levers 40, which may also be called quick lock levers. After this, the magazine 37 is shoved parallel to the contact surface 11 in a first direction as far as the end stop of the brackets 47. The stapler may then be lifted relative to the magazine, perpendicular to the contact surface 11, until the recesses of the guide elements 44 are removed from the brackets. The magazine 37 is now separated from the stapler 1 and freely accessible.

Figure 10:
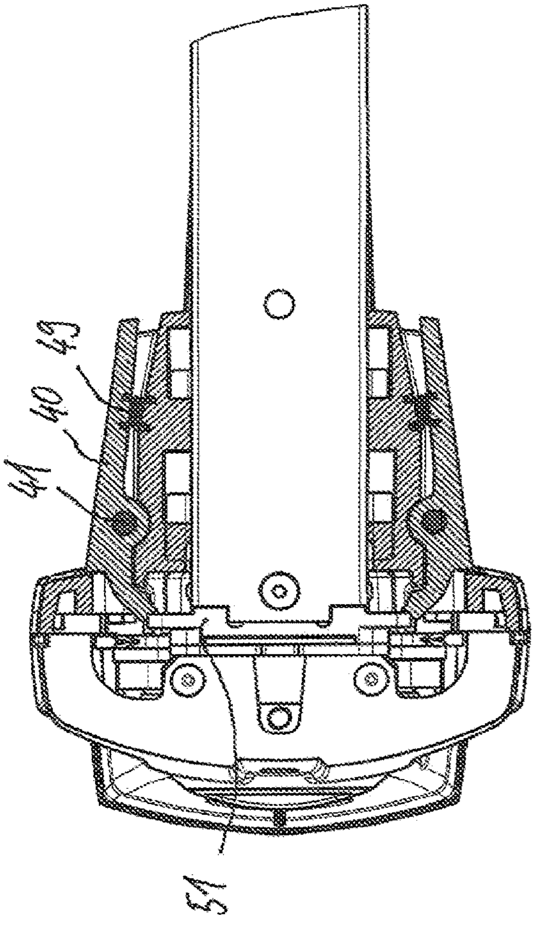
FIG. 10 is a representation per FIG. 9.

For the inserting of the magazine 37 into the stapler 1, the aforementioned movements between the magazine 37 and the stapler 1 can be performed now in reversed sequence and in reversed movement direction (FIG. 10, 11, 12). The magazine 37 can be attached by its brackets 47 from underneath to the recesses of the guide elements 44. With a movement of the magazine 37 perpendicular to the contact surface 11, the brackets 47 can be introduced into the recess and moved as far as the first end stop. After this, the magazine 37 can be moved perpendicular to the first movement in the direction of the ejecting channel 9. The rear plate 51 arranged on the magazine 37 makes contact with ends of the swivel levers 40 at the ejecting channel side and swivels them against the spring force of the spring elements 49 about their respective swivel axis 41. The rear plate 51 in this way can pass by the back-swiveled swivel levers 40, whereupon the swivel levers 40 loaded by the spring elements swivel back into their locking position, now in the opposite swivel direction. Due to the acting spring force, the swivel levers 40 snap back, which may serve as a sign of a magazine 37 properly arranged in its end position for the operator. As can be seen in the enlarged representation of one of the figures, one of the partial surfaces 40*a* of the front end face of the respective swivel lever 40 gets in front of the rear plate 51 and locks it against a pulling out of the magazine 37. The other partial surface 40*b* of the front end face, on the other hand, lies against the side surface (end face) 51*a* of the rear plate 51 and in this way is prevented from further movement about the swivel axis. Thus, the swivel levers 40 remain in this position. Hence, besides the magazine 37, the rear plate 51 is also arranged in its intended nominal position on the stapler 1, in which it bounds the ejecting channel 9 at the magazine side.

To prevent the stapler from triggering when the magazine 37 is not installed in the stapler, the stapler comprises a movable blocking device. The blocking device can be swiveled into the movement path of the ejector 8 to prevent the ejector 8 from moving to its ejection position. The blocking device can be situated in two end positions, whereby the blocking device in the first end position is situated outside the movement path of the ejector 8 and thus enables the ejector to move to its ejection position to eject a staple. In the second end position, on the other hand, the blocking device is in the movement path and thus it blocks the ejector from moving to its ejection position.

In the exemplary embodiment of the present disclosure, the blocking device is a swivelable pawl 55 arranged on a shaft 56 and pivotable about the longitudinal axis of the shaft 56. The shaft 56 and its swivel axis are oriented perpendicular to the movement axis MA of the ejector 8 and parallel to the base leg 12*a* of the respective staples 12 situated in the magazine. The pawl 55 has two legs 55*a*, 55*b*, one leg 55*a* being located on one side of the shaft 56 and the other leg 55*b* being located on the opposite side of the shaft. The pawl 55 has a driving lug 57 on the leg 55*a* at its lower end, close to the exit opening 10. Furthermore, a compression spring 58 presses against the other leg 55*b*, which thereby tends to press the leg 55*b* in the direction of the ejector. If no other force is acting against the pawl 55, the force of the compression spring will swivel the pawl 55 with its leg 55*b* into a groove 8*a* of the ejector 8. In this end position, the leg 55*b* of the pawl 55 thus blocks the ejector against a movement in the ejecting channel 9 to the ejection position.

Figure 13:
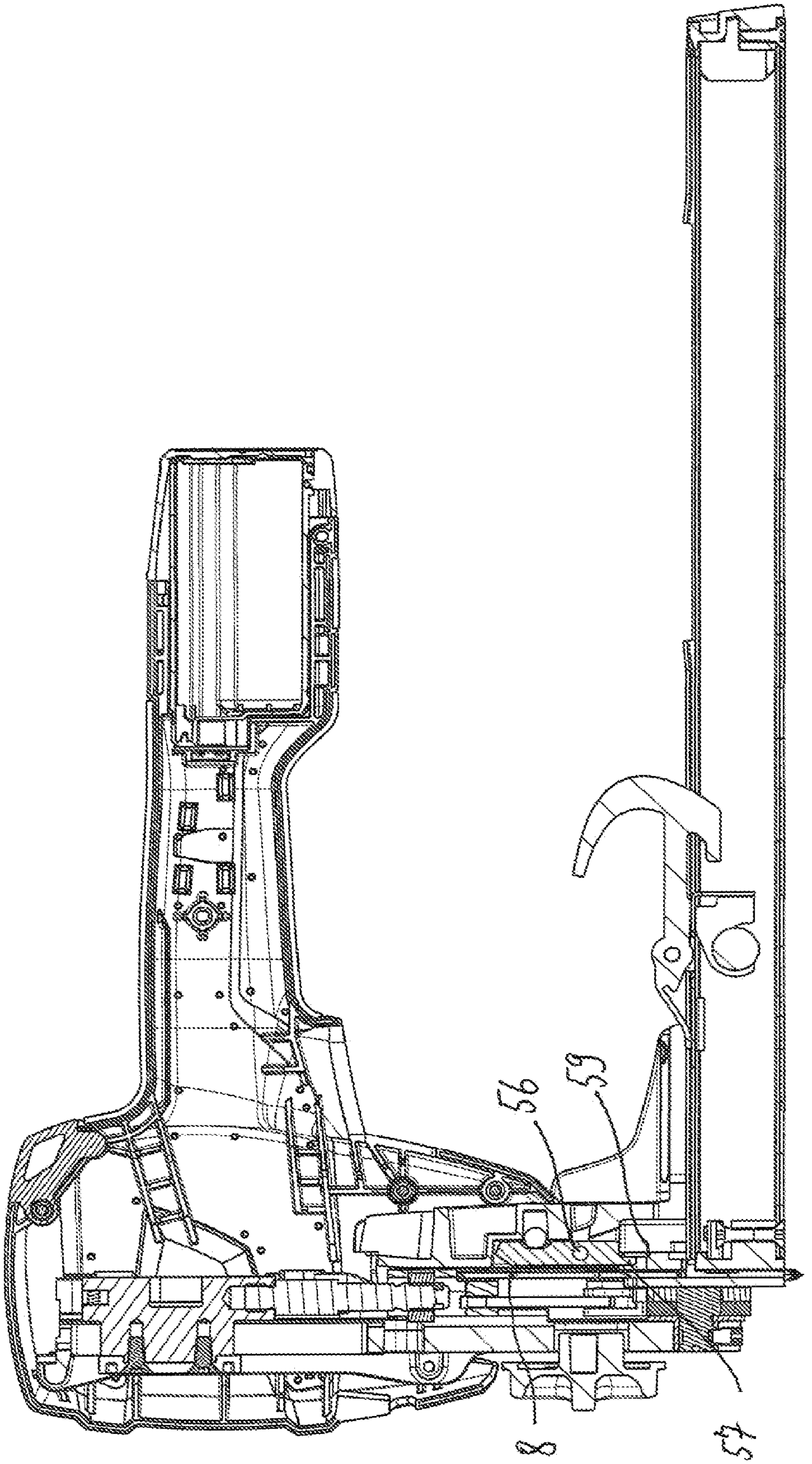
FIG. 13 is a longitudinal section through the stapling device of FIG. 1 showing a blocking device for the ejector.
Figure 14:
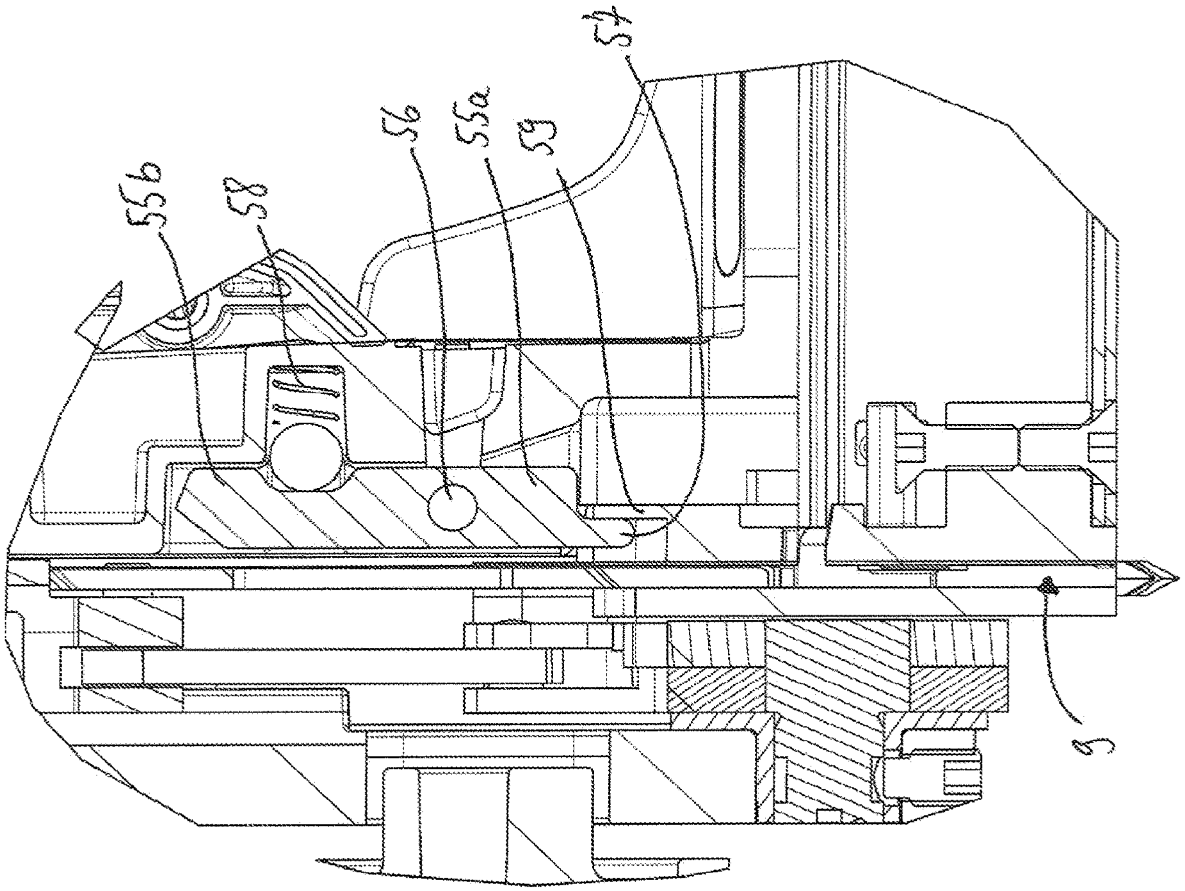
FIG. 14 shows the blocking device of FIG. 13 in a release position.
Figure 15:
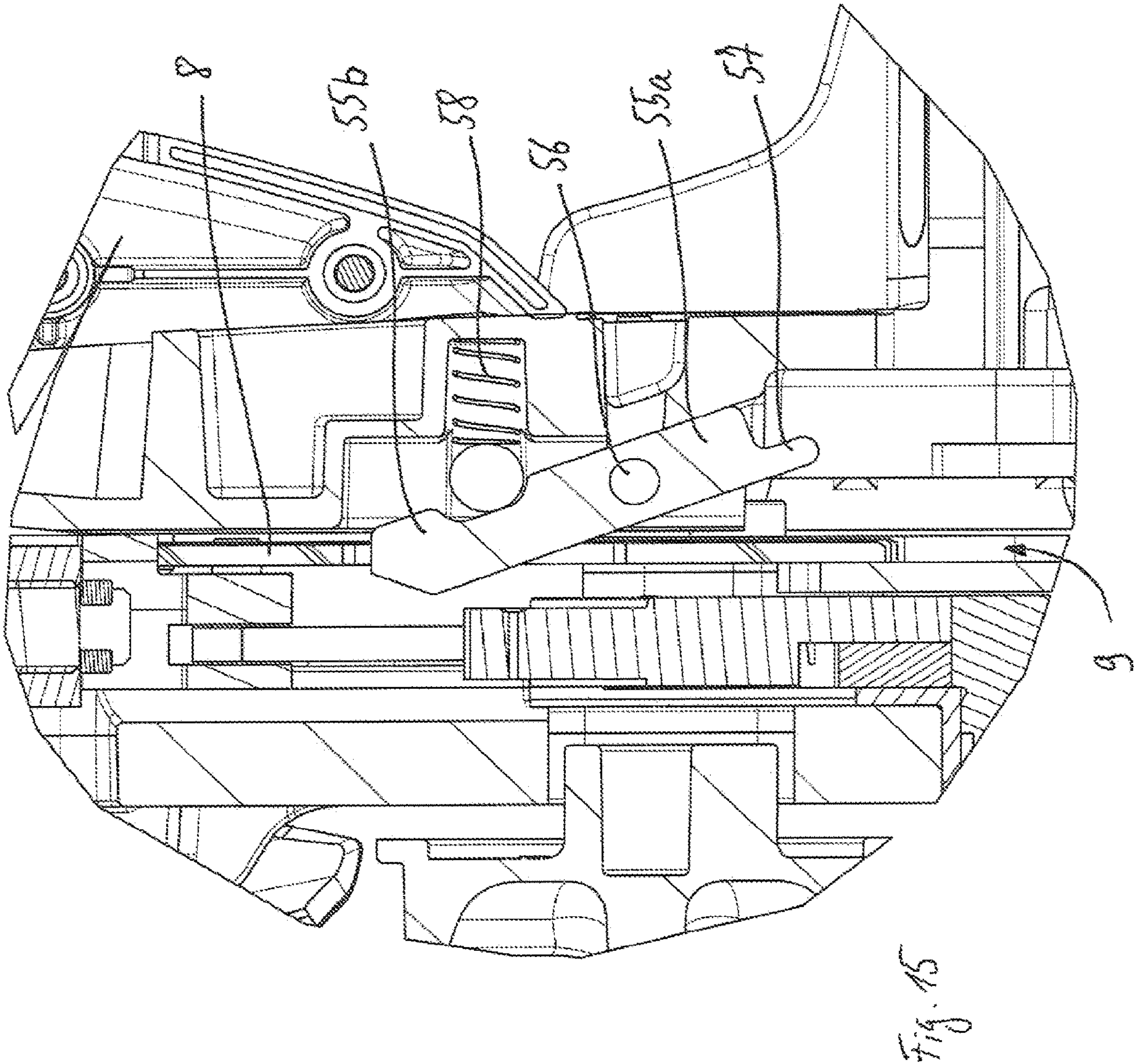
FIG. 15 shows the blocking device of FIG. 13 in a blocking position.
Figure 16:
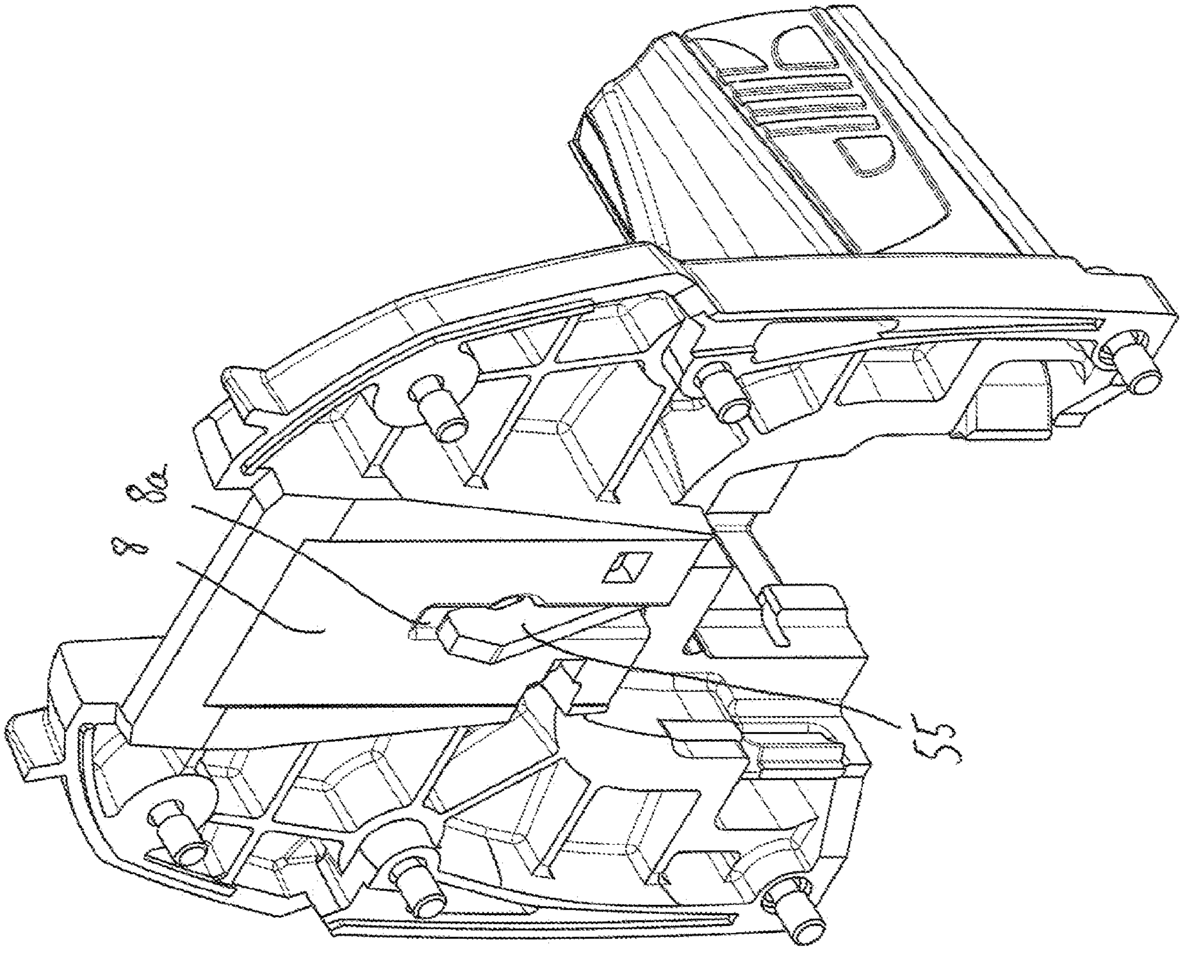
FIG. 16 is a perspective representation of the blocking device of FIG. 13 with a pawl in the blocking position.

By inserting a magazine 37 into the stapler, a component 59 of the magazine pushes against the leg 55*a* of the pawl shortly before reaching the end position of the magazine in the stapler 1. During the movement of the magazine 37 parallel to its longitudinal extension, the component of the magazine engages the driving lug 57 of the pawl 55 and swivels the pawl 55 against the spring force of the compression spring, so that the leg 55*b* is swiveled out from the groove of the ejector 8 and thus also out from the movement path of the ejector 8. When the magazine 37 has reached its end position, it holds the pawl 55 by bearing against the driving lug 57 in a second end position, in which the pawl 55, in the representation of FIG. 13, 14, is oriented substantially vertically and parallel to the ejecting direction of the staples. The pawl 55 in this second end position is situated outside the ejecting channel 9 and thus clears the ejector for an ejecting movement. When the magazine 37 is removed once more, it then again releases the driving lug 57 and thus the pawl 55. In this way, the pawl 55 can once again be moved into its end position in which it blocks the ejector 8 during the removal movement, on account of the force of the compression spring 58.

Figure 17:
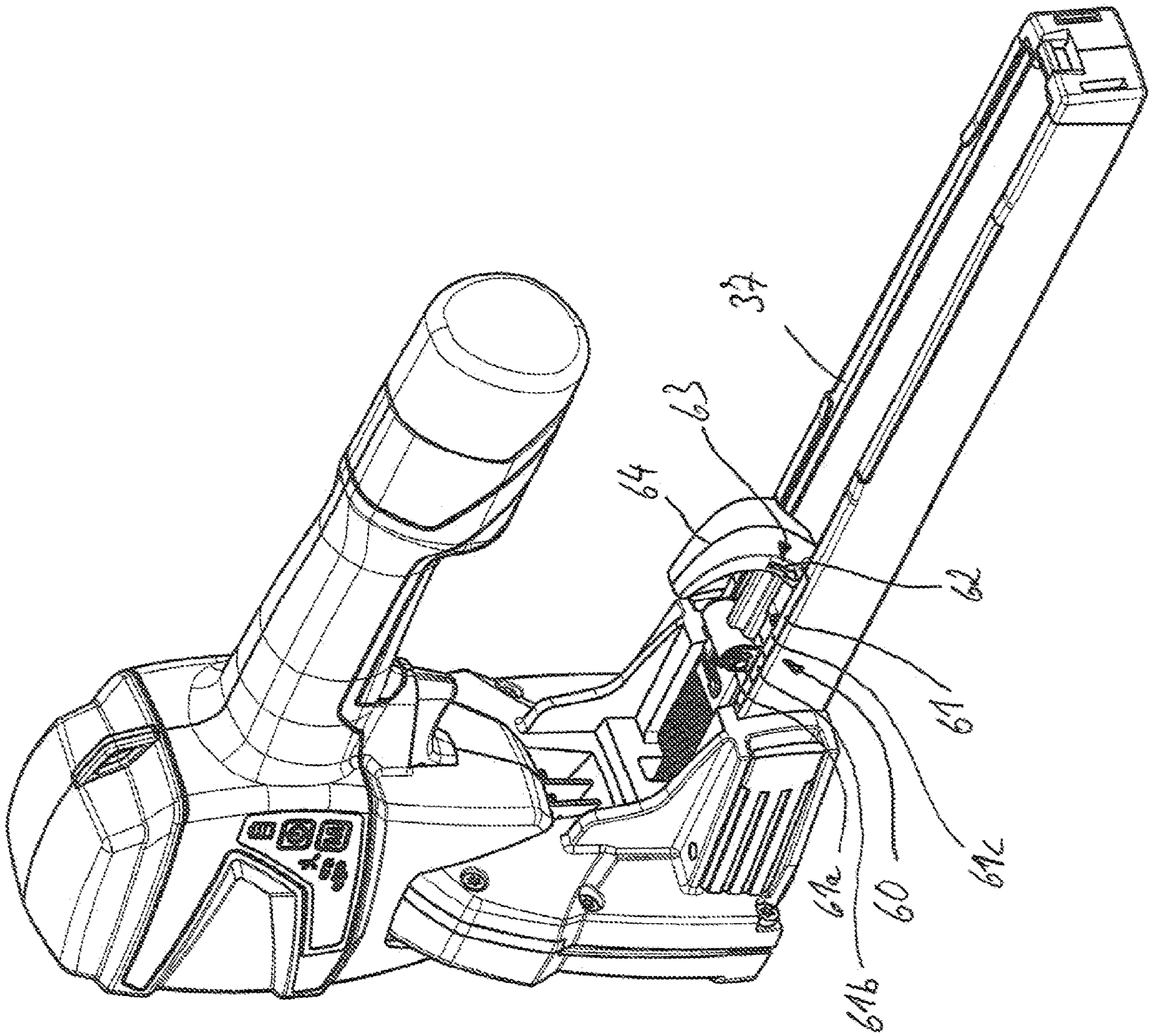
FIG. 17 is a perspective representation of the stapling device of FIG. 1 with a marking device arranged on the magazine assembly.
Figure 19:
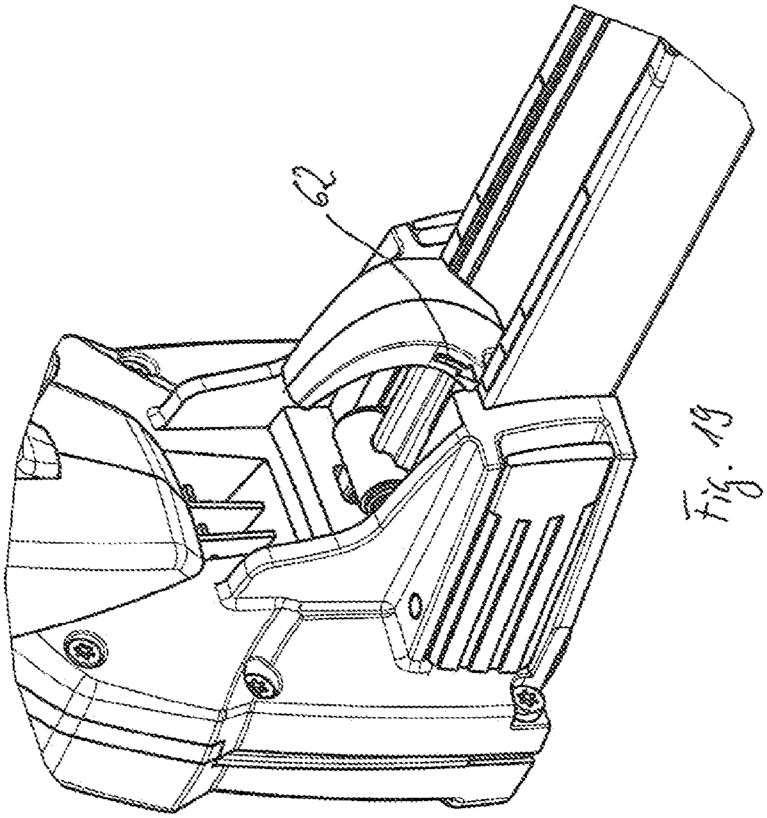
FIG. 19 shows the marking device with nearly all staples ejected from the magazine.
Figure 18:
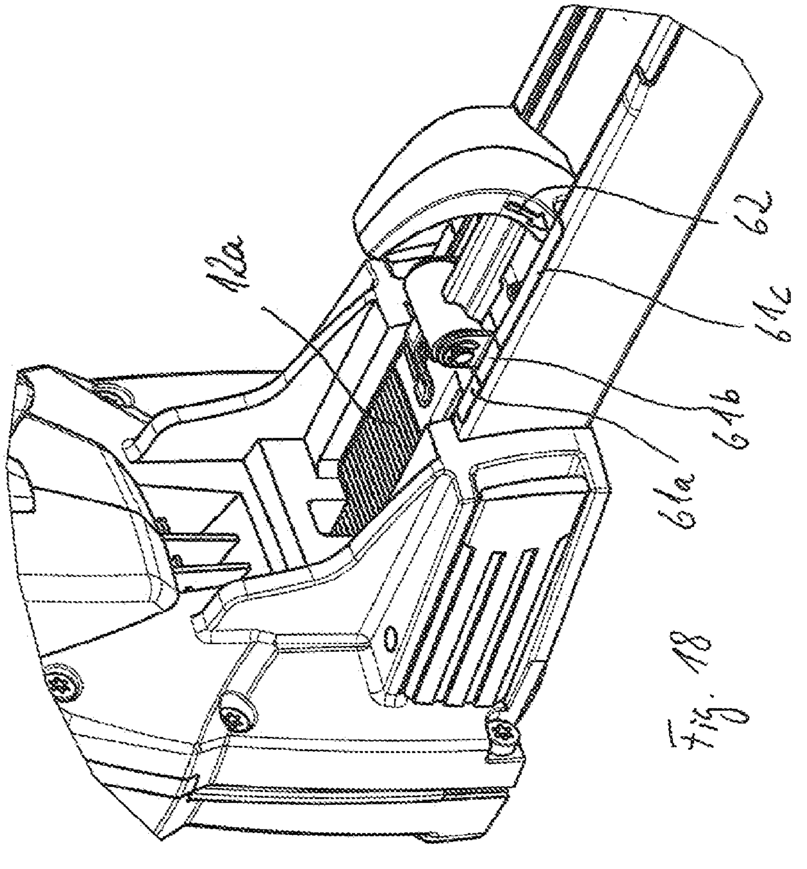
FIG. 18 shows the marking device upon further use of the staples.

As can be seen from FIGS. 17, 18, the magazine is provided with a fill level display 60. For this, a marking 61 is placed on one or more stationary parts of the magazine 37, showing the degree of fullness of the supply of staples in the magazine. The markings for example may have optically perceivable differences along the direction of supply or stacking of the staples in the magazine, standing for a different degree of fullness and symbolizing that degree. The optical differences for example may be different colored partial markings 61*a*, 61*b*, and 61*c*. In particular, a minimum fill level marking at which the magazine needs to be filled again can be designated with a signal color, such as red, in particular signal red. Of course, other kinds of markings are also conceivable and possible, such as different geometrical shapes. An acoustic signal may also be provided, either in addition or by itself, for reaching a minimum fill level.

The magazine 37 furthermore has a display or indication device 63 which moves along with the stack of staples that is depleted during use, which shows the particular fill level of the magazine 37 with staples 12 at the markings 61. An especially favorable solution for this is a spring-loaded slide 64, with which the stack of staples 12 arranged in the magazine 37 is pushed in the direction of the ejecting channel 9 of the stapler 1, serving to display or indicate the fill level with the aid of one or more markings 61. A simple design form can, for example, be provided in that one end face of the slide 64, by which the slide rests against the stack of staples, indicates or represents the particular fill level at the markings. The solution realized in the exemplary embodiment calls for an arrow 62 arranged on the slide and pointing at the markings as the indication device 63. The arrow may be arranged for example on a handle piece of the slide 64, with which the slide can be moved in the magazine 37 also by hand, in particular it can be pulled back for the holding of staples.

Figure 20:
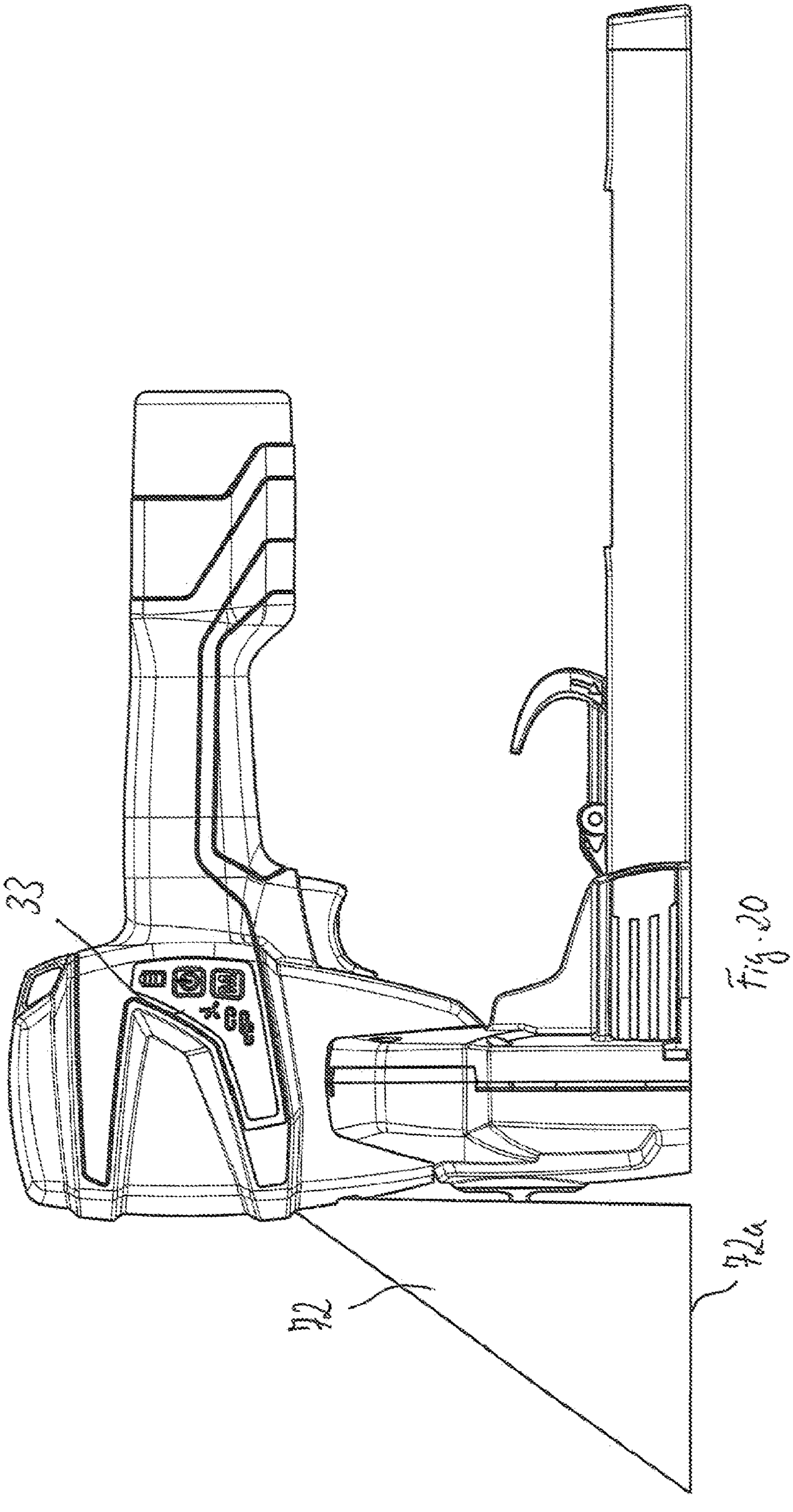
FIG. 20 is a side view of the stapling device with a light beam of a light-emitting device as a positioning aid.
Figure 21:
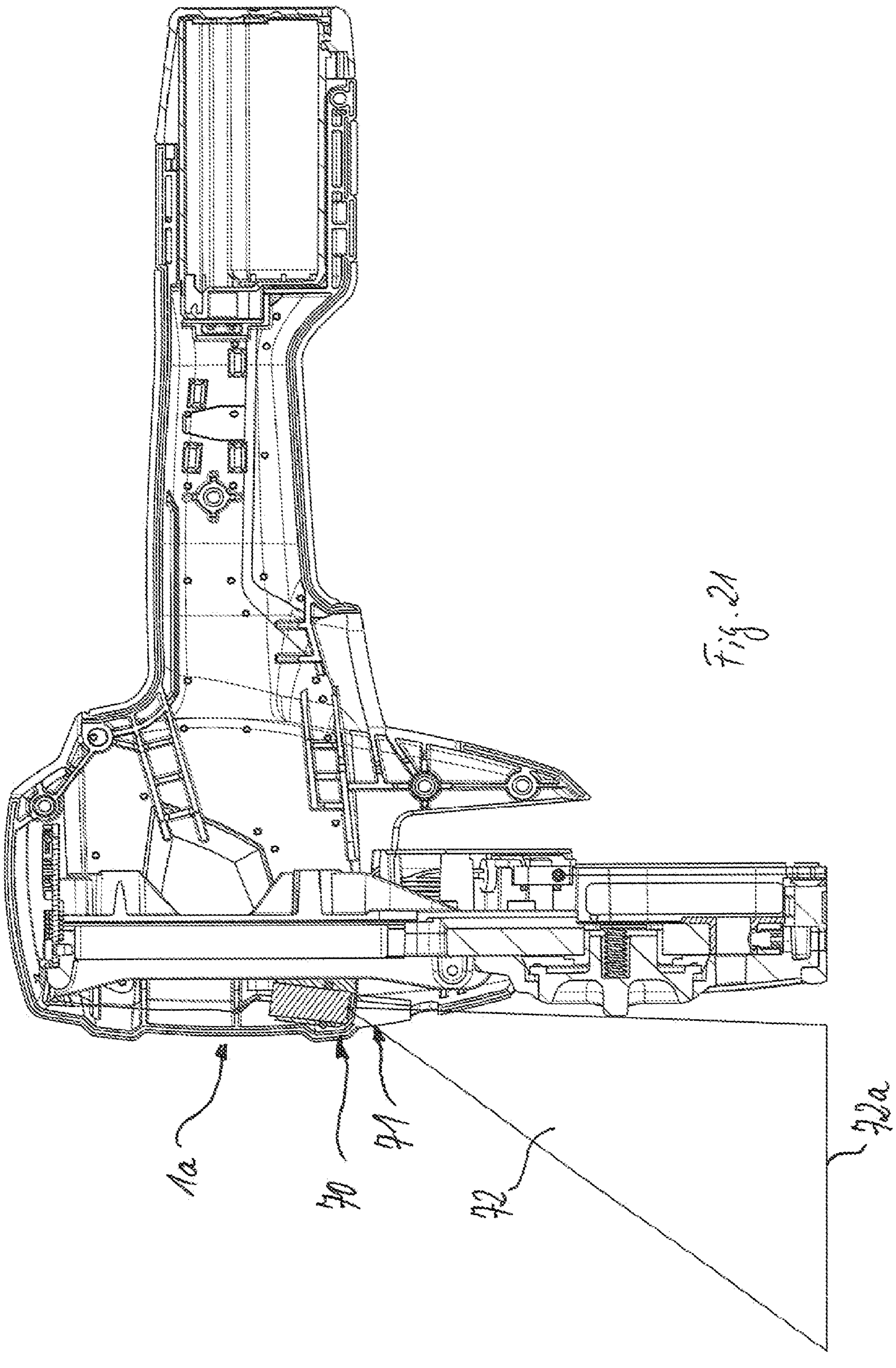
FIG. 21 is a sectional representation of the stapling device of FIG. 20.
Figure 22:
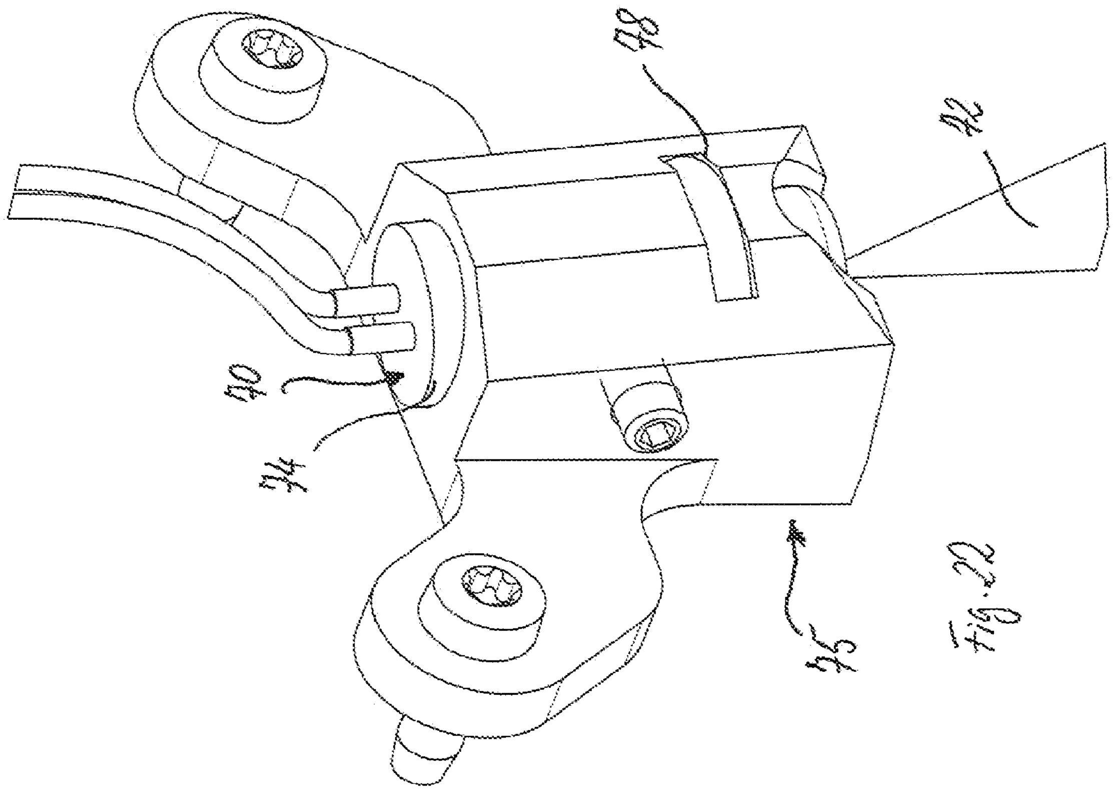
FIG. 22 shows the light-emitting device of FIG. 20 in a holder of the stapling device.
Figure 23:
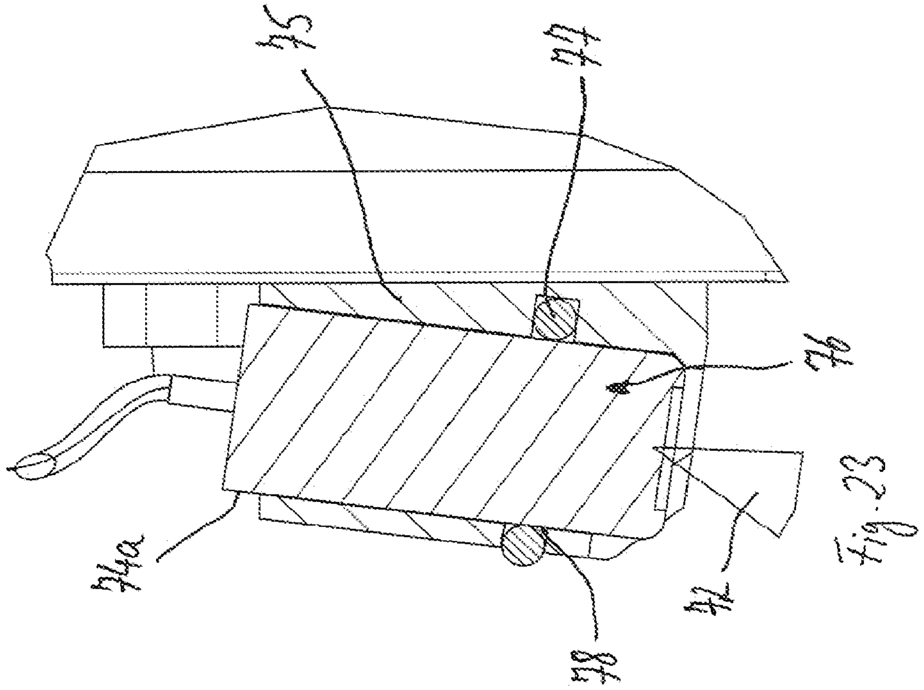
FIG. 23 is a sectional representation of the representation of FIG. 22.
Figure 25:
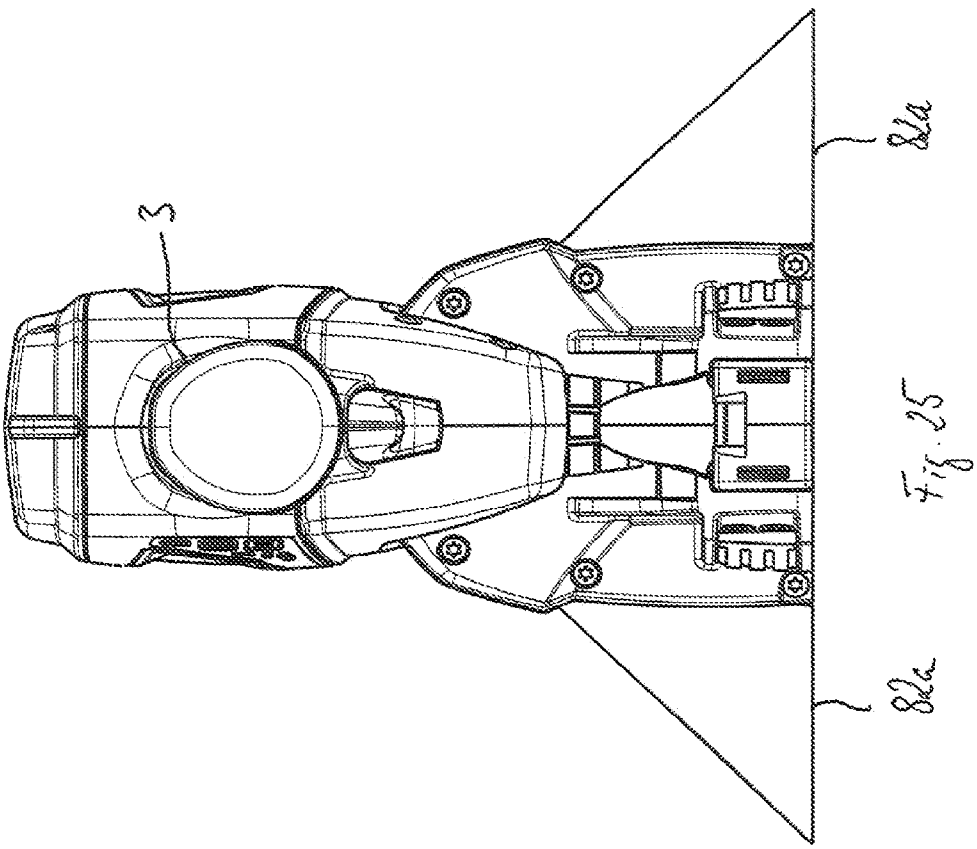
FIG. 25 is the representation of FIG. 24 from a rear view.
Figure 24:
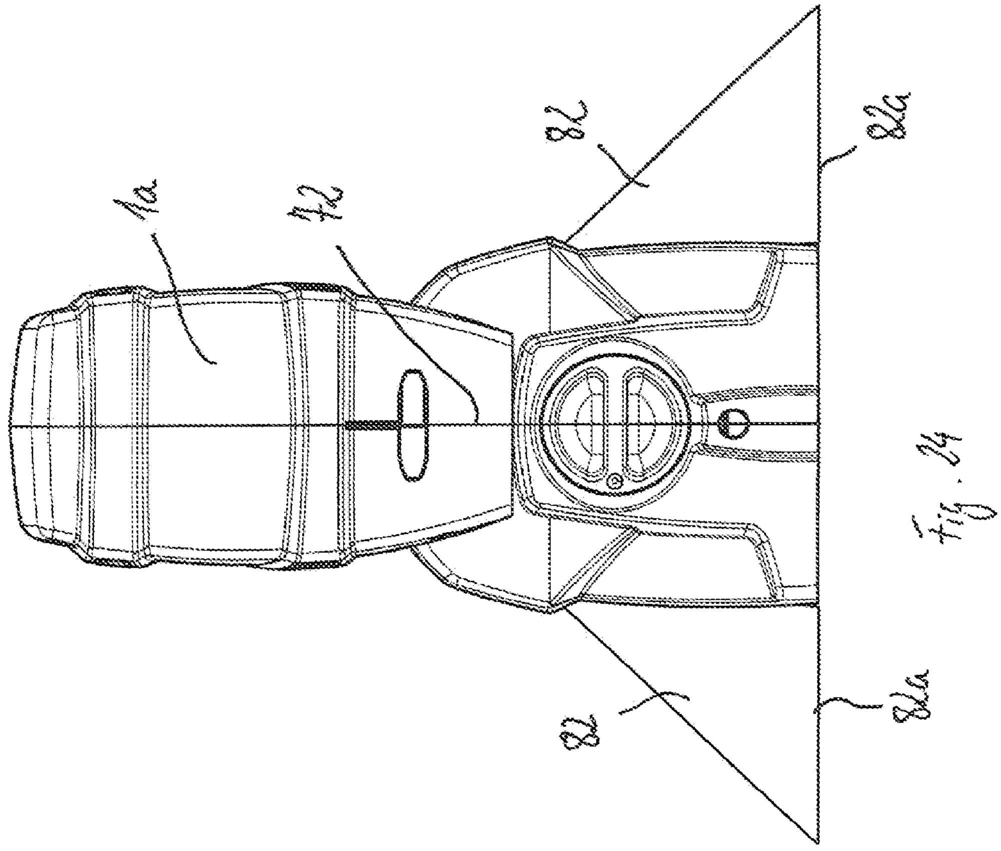
FIG. 24 shows the stapling device with two light beams emerging at the side of the stapling device from two further light-emitting devices in a front representation.
Figure 26:
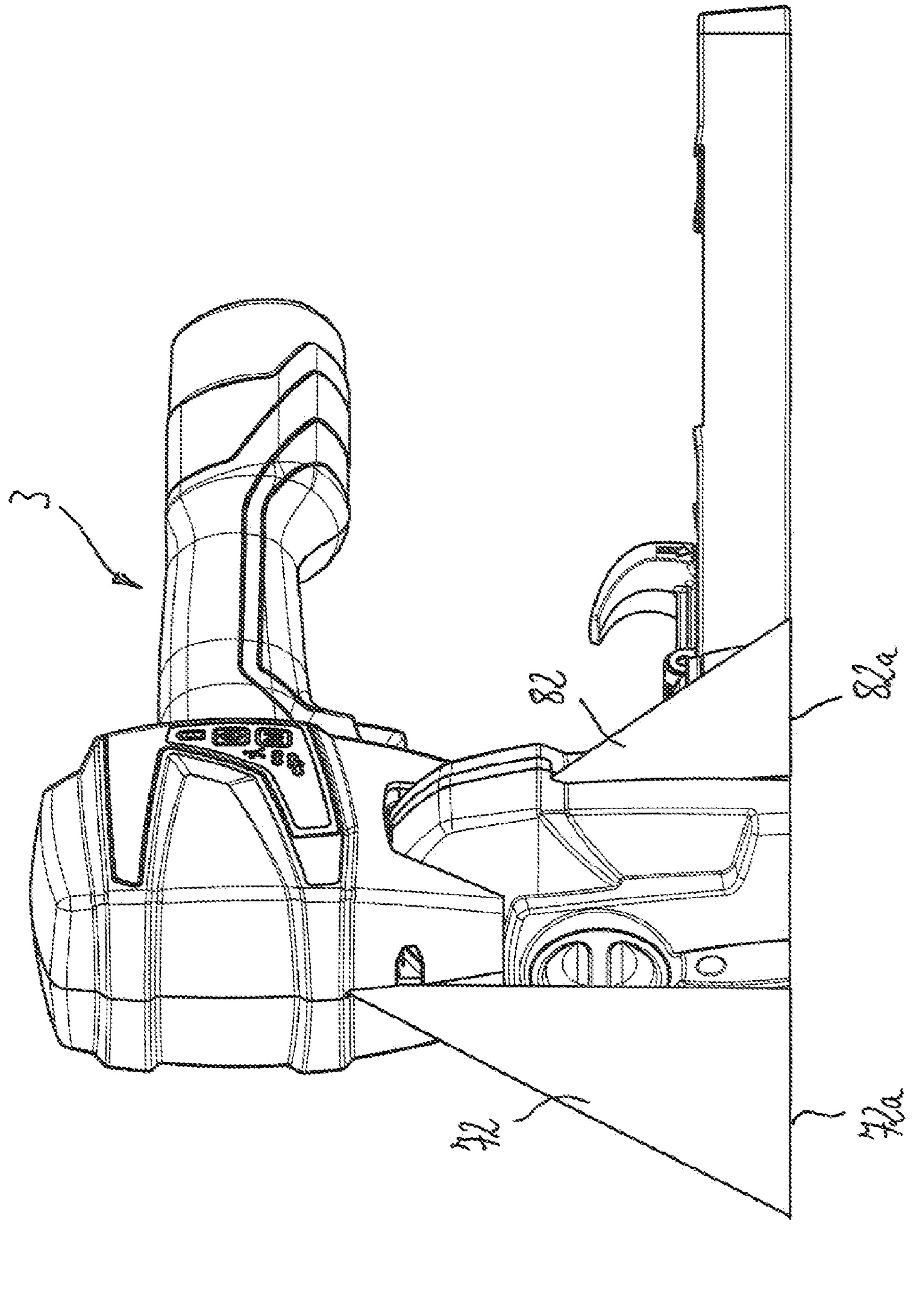
FIG. 26 is a perspective representation of two light beam planes oriented perpendicular to each other from two light-emitting device of FIG. 20-25.
Figure 27:
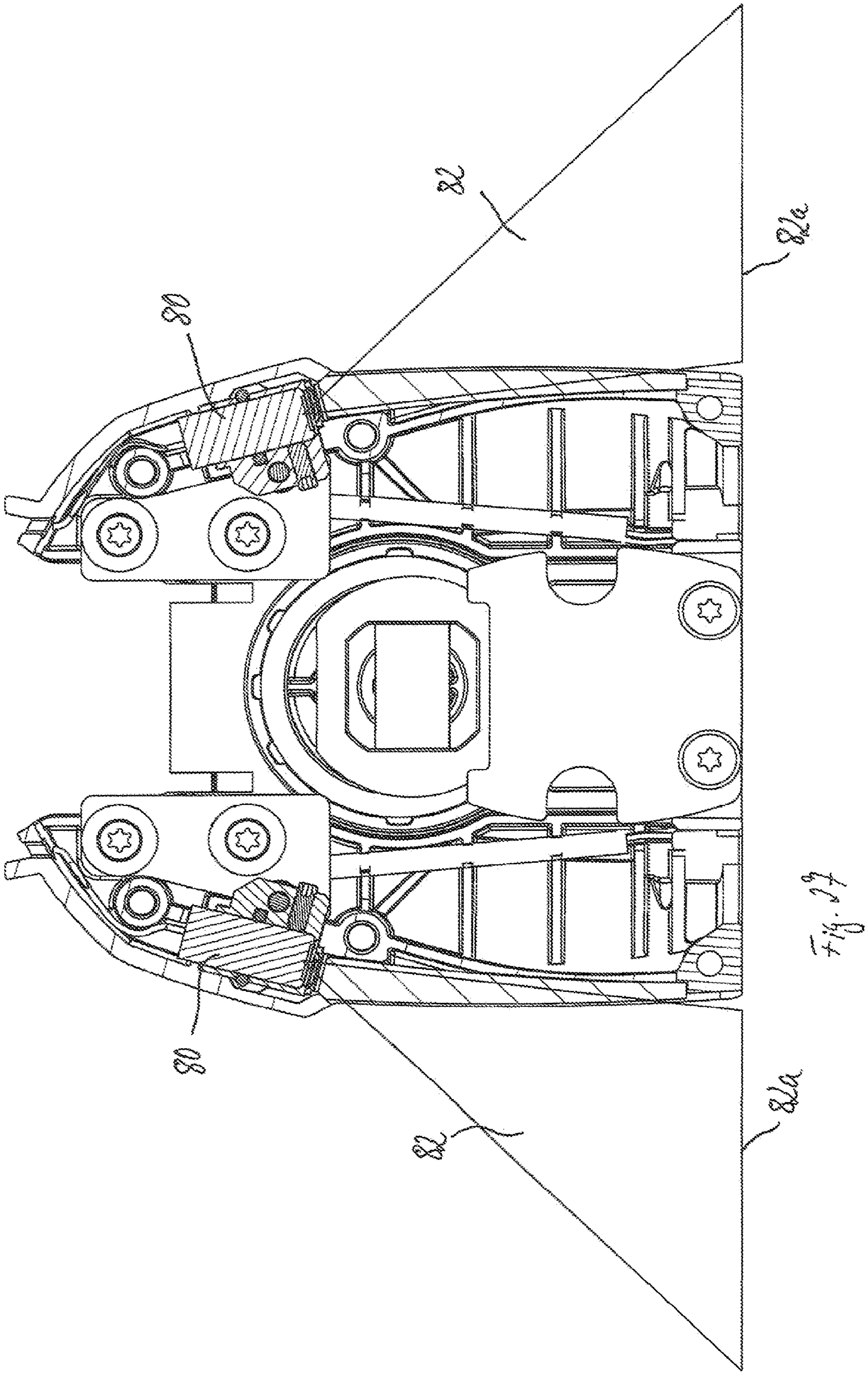
FIG. 27 is a sectional representation of the front end of the stapling device with the representation of two light-emitting device emitting light planes aligned with each other.
Figure 29:
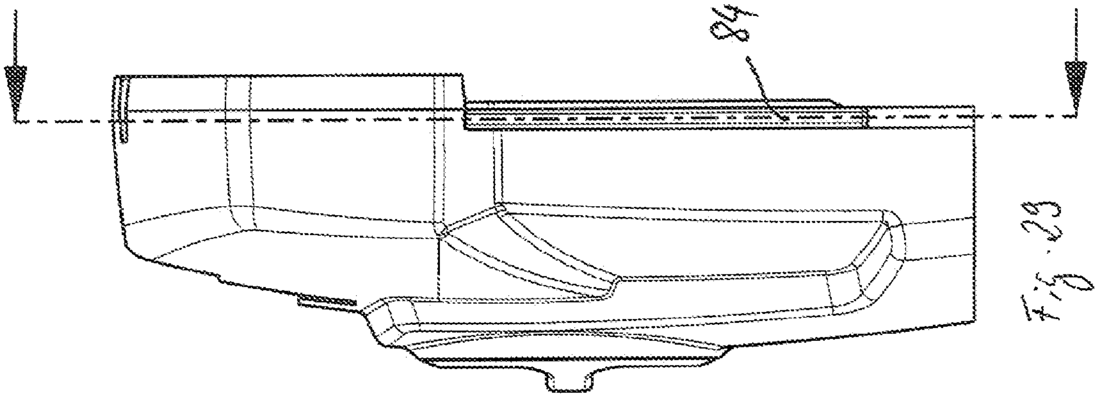
FIG. 29 is a side view of the representation of FIG. 28.
Figure 28:
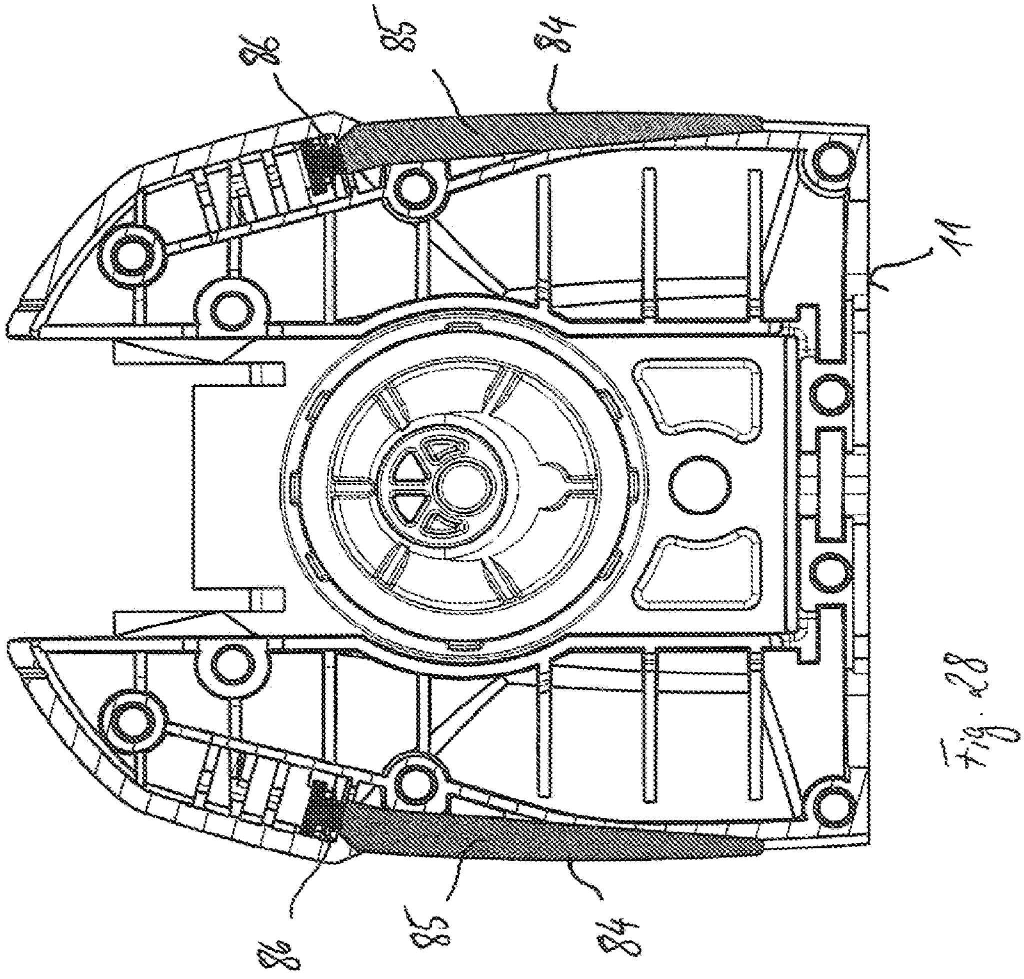
FIG. 28 is a sectional representation per FIG. 27 of an alternative light-emitting device and with two light shafts.
Figure 30:
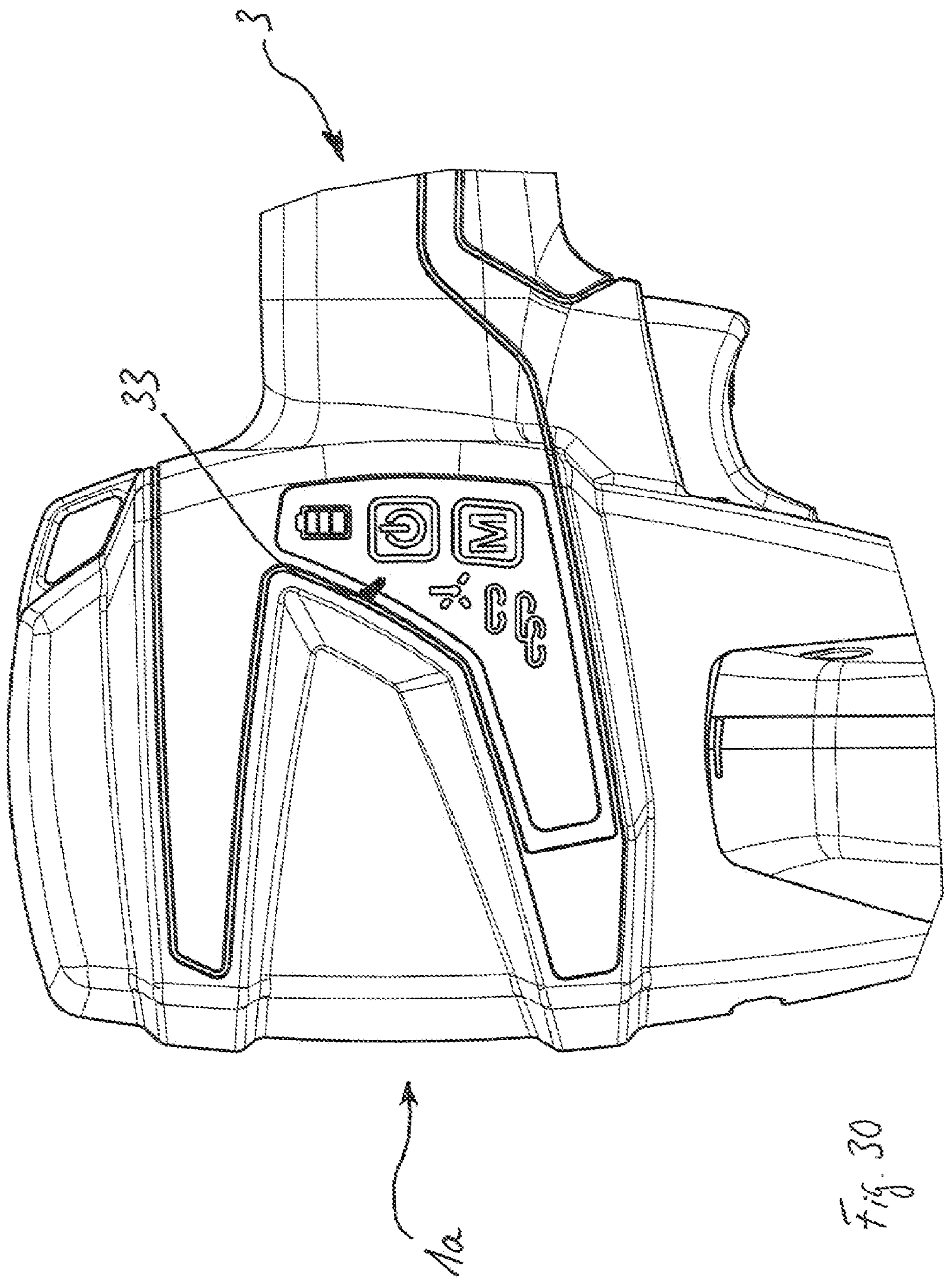
FIG. 30 shows a head area of the stapling device in a partial representation with a display and control device provided on the stapling device.
Figure 31:
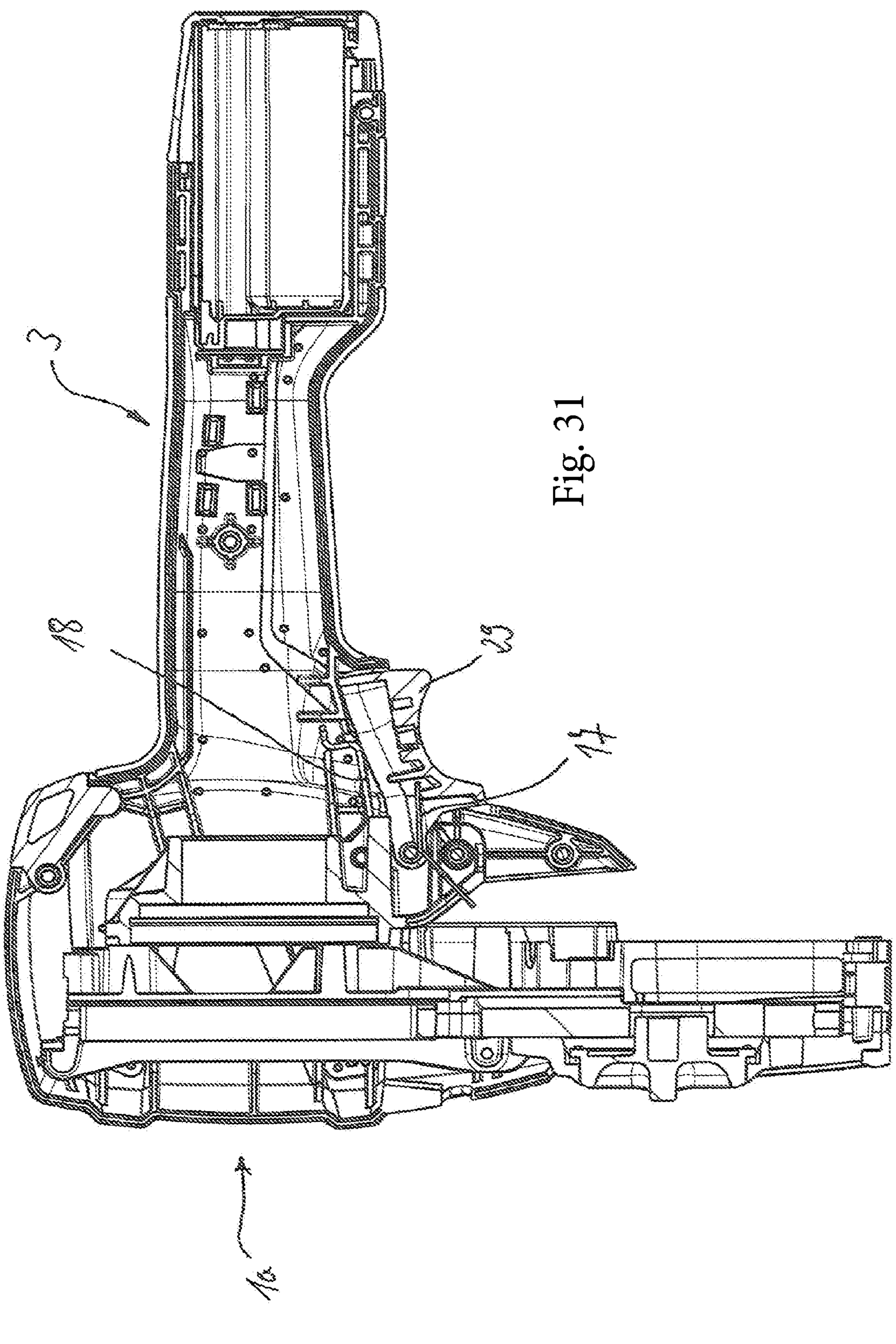
FIG. 31 is a sectional representation of the stapling device with a trigger and two spring elements counteracting the operating force of the trigger.
Figure 32:
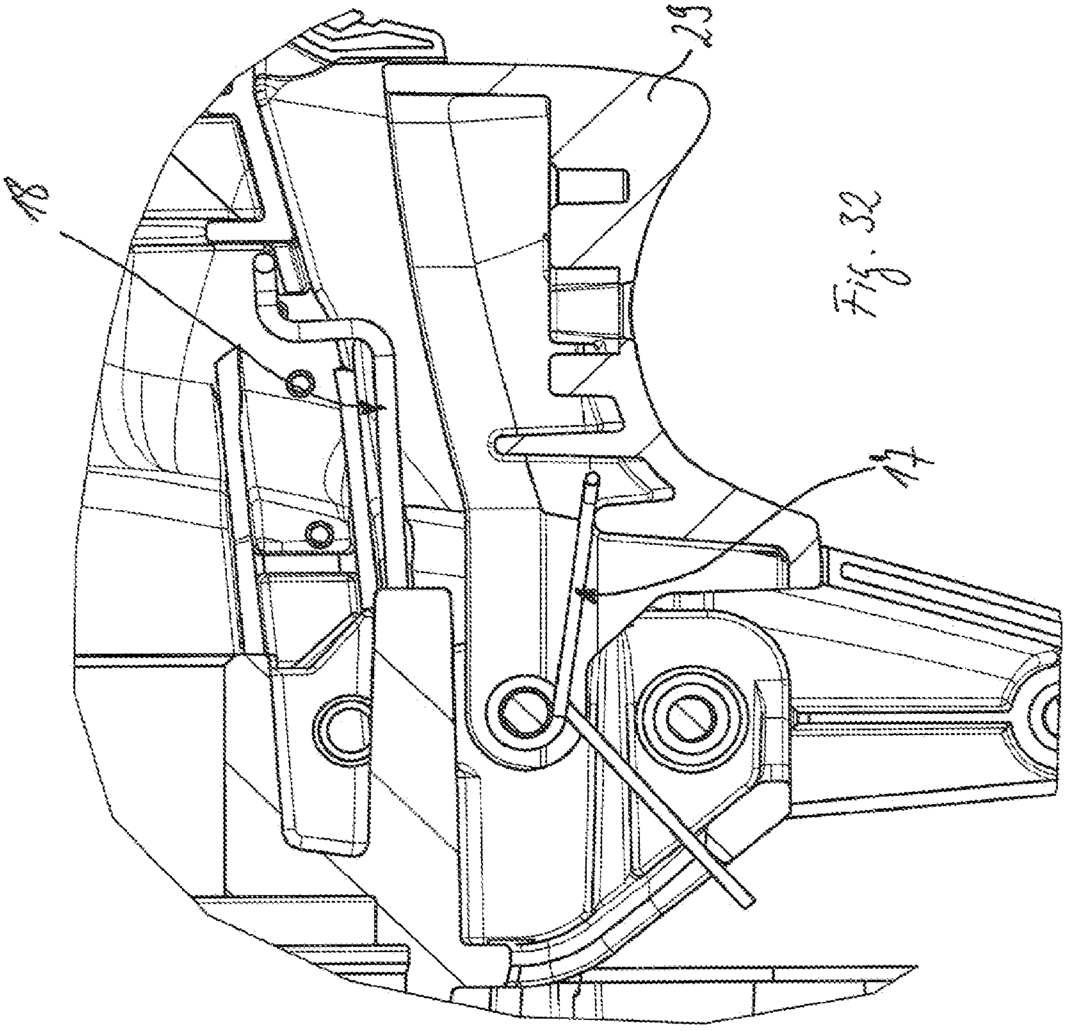
FIG. 32 is a partial representation of FIG. 31 with the trigger in an early stage of activation, and with the two spring elements, one of them lying against the trigger and the other one spaced away from the trigger.
Figure 33:
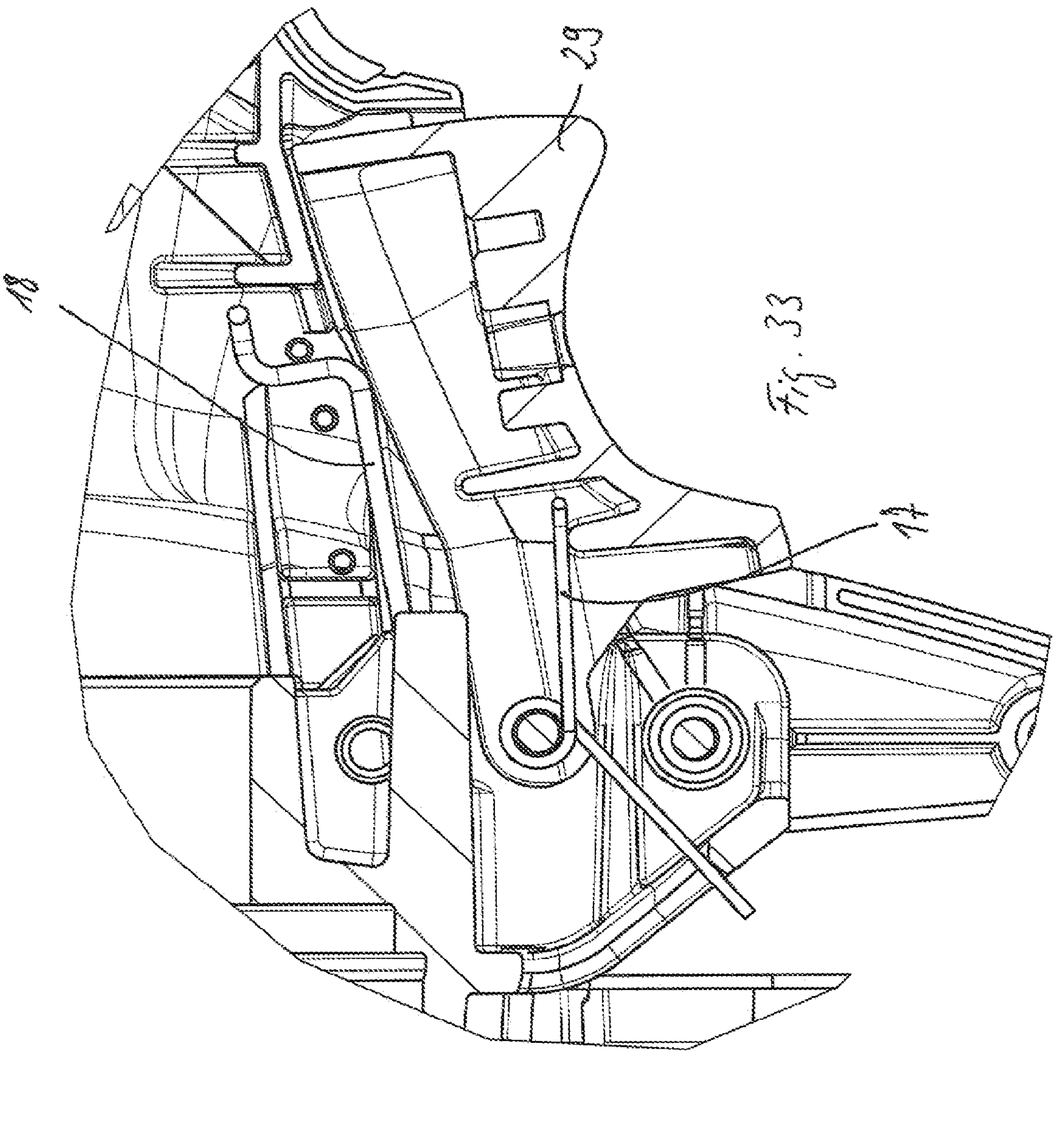
FIG. 33 is a representation per FIG. 32 with the trigger in a later stage of its activation, in which both spring elements lie against the trigger.
Figure 34:
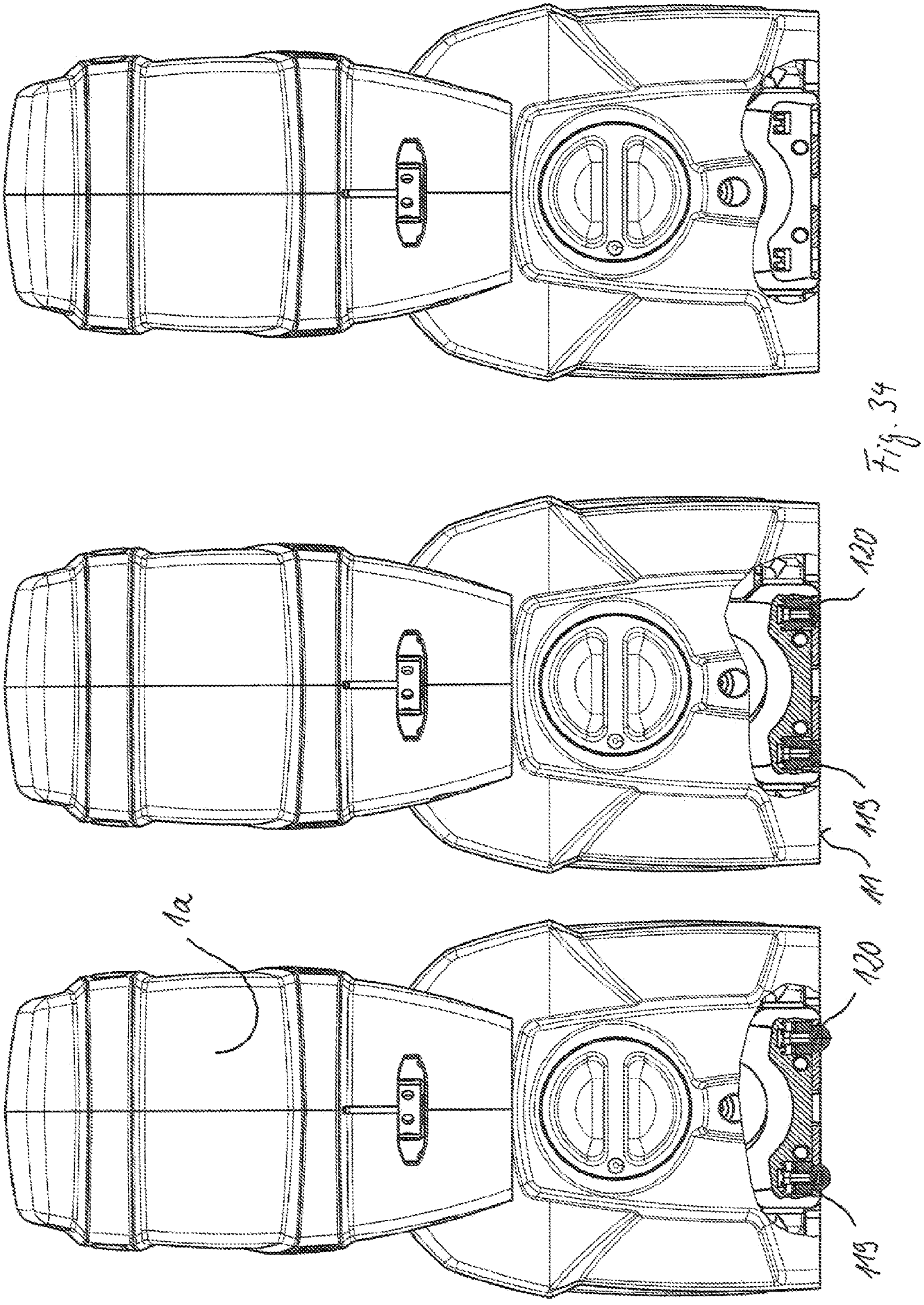
FIG. 34 is three front views each with a stapling device, being provided with two mechanical detecting device (contact switches) for the detection of an object in the area of a contact surface, the detecting device being shown in different detection states in two partly sectioned representations.

FIGS. 20-28 show the stapler 1 with a device 70 of emitting light from the housing of the stapler. The light-emitting device 70 is situated at the front end 1*a* of the housing. In the exemplary embodiment, this light-emitting device 70 is a line laser situated in the housing above the ejecting channel 9. The laser 70 emits in the forward direction from a housing opening 71 in front of the stapler 1. As can be seen in FIG. 20, 21, the line laser emits, as its light beam 72, a light plane directed at the object to-be-stapled. This light plane can be perceived on the object as a projected straight running line 72*a*. Since the laser 70 emits light from the housing opening 71 in the as exactly as possible middle parting plane of the housing, which is also situated in the middle of the ejecting channel 9 and in the middle of the base leg 12*a* of the staples 12 that are present in the ejecting channel 9, the projected line 72*a* reflects the middle of the base leg 12*a* of the staples 12 being ejected. Hence, a user of the stapler can set the staples 12 as precisely as possible, orienting himself to the line 72*a* projected onto the particular object, which indicates—in terms of the longitudinal extension of the base leg 12*a*—the middle of the base leg 12*a*, if a staple ejection were to take place in this position of the stapler. Thus, the line laser 70 has the function of a positioning aid and the user can orient himself to the projected line 72*a* to achieve a particular orientation of the stapler 1 and thus a particular orientation of a staple 12 to be ejected.

The light-emitting device 70, designed here as a line laser, as well as any other conceivable light-emitting device as a positioning aid, is able to be switched on and off, for example, by a switch or a button on the stapler 1. Likewise, in an embodiment of a stapler according to the present disclosure, it may be provided that an automatic switching on and off of the respective light-emitting device is provided when certain conditions are present, in particular, it can be switched on and off as a function. For example, an automatic switching on may occur when an operator touches the trigger 29 or his finger comes close to it and is detected. In addition or alternatively, it may also be provided that the at least one detecting device 19, 20 in the area of the contact surface 11 must detect the presence of an object directly beneath the contact surface 11 for the respective light-emitting device to be automatically switched on for the display of optically perceivable position information in regard to a staple position.

The line laser 70 has a round circular housing 74 in cross section and arranged inside the housing of the stapler 1 in a holder 75. The holder 75 likewise has a round circular receptacle 76 in cross section for this purpose, in which the line laser 70 is arranged and mounted. A longitudinal axis of the round circular receptacle 76 is directed downward at an angle onto the respective object and with a spacing in front of the stapler 1. On the outer surface 74*a* of the housing 74 of the line laser 70 there is arranged an elastically stretched O-ring 77. A segment of the O-ring 77 is situated in a recess 78 of the wall of the holder 75, so that this segment of the O-ring 77 is accessible to grasping. By a rotary activation of the O-ring 77 through the recess 78, it is possible to change the rotary position of the line laser 70 in its holder 75. The O-ring 77, arranged rigidly on the housing 74 of the laser 70, carries along the laser 70 during this activation, so that the laser 70 rotates in the holder 75. The slight clamping of the O-ring 77 in the holder 75, which is also present, is overcome during the activation and allows very slight angles of rotation of the laser 70 in the holder 75 to be performed and adjusted.

By rotating the laser 70, the orientation of the line 72*a* projected by it on an object can be changed. A deviation of the actual rotary position from the designed nominal position possibly occurring when installing the laser 70 in the holder 75 might mean that the projected (light) line 72*a* has at least a slight slanted trend in regard to the base leg 12*a* of the respective staple 12. With the O-ring 77 and the recess 78 in the holder 75, a correction of such wrong orientations can be done quickly and easily and the laser can be oriented exactly in its nominal position. Such a correction can even be done quickly and easily after the assembly and delivery of the stapler, if such a wrong orientation is discovered only during use.

The drawings show two further light-emitting devices 80 that likewise indicate position information on a staple 12 being ejected. These two light-emitting devices may likewise be designed as lasers, especially as line lasers. The two identically designed light-emitting devices 80 are each situated on one side of the stapler beneath the housing and substantially above the ejecting channel. The respective line laser 80 likewise emits its light from a housing opening angling downward onto the particular object and it can once again be optically perceived there as a straight projected line. The layout and arrangement of the two line lasers 80 as well as their arrangement in a holder including a possibility of adjustment can be provided in accordance with the solution for the laser 70.

Each of the two lasers 80 emit a light plane on different sides of the stapler, each of them projecting a line 80*a* on the particular object, being oriented perpendicular to the line 70*a* and aligned with the center line of the ejecting channel. The lines 80*a* furthermore run in alignment with the base leg 12*a* of a staple 12 being ejected. Moreover, the lines 80*a* projected by the lasers 80 on either side of the stapler are aligned with each other. Thus, the two light-emitting devices signal the longitudinal trend of a base leg 12*a* of a staple being ejected or the plane in which the three legs of a staple 12 being ejected are situated. Hence, the two light-emitting devices 80 interacting with each other also serve as a positioning aid to eject a staple in a predeterminable position and set it in an object.

In an alternative embodiment of the present disclosure, the light-emitting device 70, 80 may also be formed with light sources other than lasers. Thus, in other embodiments, lasers may be replaced in particular by one or more LEDs 86. In particular for LEDs as the light-emitting device 80, a kind of light shaft 85 can be formed each time on the housing, which has a transparent or at least partly transparent cover 84. The respective light shaft 85 lies in the plane whose position is to be indicated by the respective light-emitting device. Thus, if the stapler has a light shaft on either side of the stapler 1 with at least one shining LED situated therein, and capable of being switched on and off, then each of the two light shafts 85 will be situated within the staple plane formed by the three legs of the staple being ejected.

In one embodiment of the stapler 1 according to the present disclosure, one or more light-emitting device may also be provided in a light shaft, especially devices which can shine in different colors. Alternatively, two or more light-emitting device can also be provided in a light shaft each of them shining in only one, but not the same color. Different colors can, however, also be produced by lasers as the light-emitting device. With such embodiments, it is possible to signal not only position information but also one or more further pieces of operating or state information, such as whether the stapler 1 is ready for use, and/or whether a malfunction is present and/or which mode the stapler is in and/or whether the detection device of the trigger 29 has detected a finger on the trigger 29. Instead of or in addition to different colors for relaying optically perceivable information, blinking signals of the light-emitting device or otherwise varying light emissions of the particular light-emitting device can also be provided.

The figures also show the display/control device of the stapler as a membrane keypad 33. The membrane keypad in the exemplary embodiment is arranged on a sloping side surface of the main housing section 2 of the stapler 1. This membrane keypad 33 may have buttons for various functions which can be set or called up. In particular, the membrane keypad may be provided with one or more buttons for setting the operating modes. Likewise, the membrane keypad 33 may be provided with optically perceivable display device, to signal set functions, values, malfunctions, charge state of the storage battery and/or operating modes in an optically perceivable manner. Such display device may be light-emitting device and/or alphanumerical displays integrated in the membrane keypad. Optionally, light-emitting device and/or alphanumerical displays can also be integrated in buttons of the membrane keypad. The light-emitting device and/or the at least one alphanumerical display may also optionally represent optically perceivable information in different and changing colors, just as a blinking mode is also possible for this. In this way, in particular, warning colors such as red can indicate especially important information. In other embodiments according to the present disclosure, the stapler may also be provided with alternative display and control device. One such device can be a touchscreen, for example.

LIST OF REFERENCE NUMBERS

1 Stapler
1*a* Front end
2 Main housing section
3 Handle section
3*a* Grip
4 Magazine assembly
6 Ejecting mechanism
7 Motor
7*a* Axis of rotation
8 Ejector
8*a* Groove
9 Ejecting channel
10 Exit opening
11 Contact surface
12 Staple
12*a* Base leg
13 Longitudinal axis
14 Clincher
14*a* Blade
17 Spring element
18 Spring element
19 Detecting device
119 Detecting device
20 Detecting device
120 Detecting device
25 Power electronics board
26 Storage battery
27 Planetary gearing
28 Lever gearing
29 Trigger
30 Wiring
31 Detection device
33 Membrane keypad
37 Magazine
38 Pusher
40 Swivel lever
40*a* Partial surface
40*b* Partial surface
40*c* Rear section
41 Swivel axis
42 Guide body
43 Guide element
43*a* End stop
44 Rectangular recess (guide element)
44*a* Wall boundary
45 End face
46 Side wall
47 Bracket
49 Spring element
50 Shoulder

51 Rear plate
51*a* Side surface
55 Pawl
55*a* Leg
55*b* Leg
56 Shaft
57 Driving lug
58 Compression spring
59 Component
60 Fill level display
61 Marking
61*a* Partial marking
63 Indication device
64 Slide
70 Light-emitting device (here, laser)
71 Housing opening
72 Light beam
72*a* Line
74 Housing
74*a* Outer surface
75 Holder
76 Receptacle
77 O-ring
78 Recess
80 Light-emitting device (here, laser)
82*a* Line
82 Light beam
84 Cover
85 Light shaft
86 LED
100 Support
101 Drive shaft
105 Cam
110 Lifting element
112 Slide
112*a* First slide segment
112*b* Second slide segment
120 Transmission rod
130 Guide element
140 Clincher-mount linkages
150 Clincher mounts
MA Movement axis

The invention claimed is:

1. A stapling device comprising:
- a drive wheel;
- a slide comprising a first slide segment and a second slide segment, wherein the first slide segment and the second slide segment form an oblique angle;
- a drive shaft receivable by the slide, wherein the drive shaft is coupled to and drivable by the drive wheel such that rotation of the drive wheel in a first rotational direction moves the drive shaft from the first slide segment to the second slide segment back to the first slide segment;
- a lifting element, wherein the lifting element defines the slide and is drivable by the drive shaft; and
- an ejector coupled to the lifting element and drivable by the drive shaft, wherein movement of the drive shaft from the first slide segment to the second slide segment moves the ejector and the lifting element along an axis from a home position to an ejection position, and wherein movement of the drive shaft from the second slide segment back to the first slide segment moves the ejector and the lifting element along the axis from the ejection position back to the home position.

2. The stapling device of claim 1, further comprising a pair of clinchers each movable between respective home positions and respective bending positions and configured to bend a leg of a staple.

3. The stapling device of claim 2, further comprising a guide element coupled to the ejector and rotatably coupled to the pair of clinchers.

4. The stapling device of claim 2, wherein the lifting element is operably connected to the clinchers such that movement of the lifting element between the home position and the ejection position moves the clinchers between their respective bending positions and their respective bending positions.

5. The stapling device of claim 1, further comprising a motor configured to drive the drive wheel in the first rotational direction.

6. The stapling device of claim 1, wherein the drive shaft further comprises a cam coupled to the drive shaft, wherein movement of the drive shaft from the first slide segment to the second slide segment rotates the cam in a first rotational direction.

7. The stapling device of claim 6, wherein movement of the drive shaft from the second slide segment back to the first slide segment rotates the cam in a second rotational direction, opposite the first rotational direction.

8. The stapling device of claim 1, wherein the second slide segment is perpendicular to a movement axis, and the first slide element forms an oblique angle relative to the second slide segment.

9. The stapling device of claim 8, wherein the ejector moves along to the movement axis when moving between the home position and the ejection position.

10. The stapling device of claim 8, wherein the orientation of the first slide element and the second slide element relative to the movement axis does not change as the ejector moves between the home position and the ejection position.

11. The stapling device of claim 1, further comprising a cam coupled to the drive shaft, wherein movement of the drive shaft from the first slide segment to the second slide segment rotates the cam in a first rotational direction, and wherein movement of the drive shaft from the second slide segment back to the first slide segment rotates the cam in a second rotational direction, opposite the first rotational direction.

12. A stapling device comprising:
- a drive wheel;
- a lifting element defining a slide, the slide comprising a first slide segment and a second slide segment, wherein the first slide segment and the second slide segment form an oblique angle;
- a drive shaft receivable by the slide, wherein the drive shaft is coupled to and drivable by the drive wheel such that rotation of the drive wheel in a first rotational direction moves the drive shaft from the first slide segment to the second slide segment back to the first slide segment;
- a lifting element, wherein the lifting element defines the slide and is drivable by the drive shaft; and
- an ejector coupled to the lifting element and drivable by the drive shaft, wherein movement of the drive shaft from the first slide segment to the second slide segment moves the ejector and the lifting element along an axis from a home position to an ejection position, and wherein movement of the drive shaft from the second slide segment back to the first slide segment moves the ejector and the lifting element along the axis from the ejection position back to the home position.

13. The stapling device of claim 12, further comprising a pair of clinchers each movable between respective home positions and respective bending positions and configured to bend a leg of a staple.

14. The stapling device of claim 13, further comprising a guide element coupled to the ejector and rotatably coupled to the pair of clinchers.

15. The stapling device of claim 13, wherein the lifting element is operably connected to the clinchers such that movement of the lifting element between the home position and the ejection position moves the clinchers between their respective bending positions and their respective bending positions.

16. The stapling device of claim 12, further comprising a motor configured to drive the drive wheel in the first rotational direction.

* * * * *